United States Patent
Hebron et al.

(10) Patent No.: US 9,819,698 B2
(45) Date of Patent: Nov. 14, 2017

(54) METHOD AND APPARATUS FOR MOCA NETWORK WITH PROTECTED SET-UP

(71) Applicant: MaxLinear, Inc., Carlsbad, CA (US)

(72) Inventors: Yoav Hebron, San Diego, CA (US); Na Chen, San Diego, CA (US); Zong Liang Wu, San Diego, CA (US); Ronald Lee, San Diego, CA (US)

(73) Assignee: MAXLINEAR, INC., Carlsbad, CA (US)

(*) Notice: Subject to any disclaimer, the term of this patent is extended or adjusted under 35 U.S.C. 154(b) by 76 days.

(21) Appl. No.: 14/921,667

(22) Filed: Oct. 23, 2015

(65) Prior Publication Data

US 2016/0044009 A1  Feb. 11, 2016

Related U.S. Application Data

(63) Continuation-in-part of application No. 14/857,453, filed on Sep. 17, 2015, and a continuation-in-part of application No. 14/808,193, filed on Jul. 24, 2015.

(60) Provisional application No. 62/068,621, filed on Oct. 24, 2014, provisional application No. 62/051,532, filed on Sep. 17, 2014, provisional application No. 62/028,317, filed on Jul. 24, 2014.

(51) Int. Cl.
| | |
|---|---|
| *H04L 29/06* | (2006.01) |
| *H04L 9/08* | (2006.01) |
| *H04L 9/32* | (2006.01) |

(52) U.S. Cl.
CPC ............ *H04L 63/20* (2013.01); *H04L 9/0841* (2013.01); *H04L 9/3239* (2013.01)

(58) Field of Classification Search
CPC ...... H04L 63/20; H04L 9/0841; H04L 9/3239
See application file for complete search history.

(56) References Cited

U.S. PATENT DOCUMENTS

| | | | |
|---|---|---|---|
| 7,961,674 B2 * | 6/2011 | Jing | H04L 12/2809 370/328 |
| 2011/0173435 A1 * | 7/2011 | Liu | H04L 63/061 713/150 |
| 2014/0250509 A1 * | 9/2014 | Ansley | H04L 63/083 726/6 |
| 2015/0229473 A1 * | 8/2015 | Klein | H04L 9/0841 713/171 |
| 2016/0065362 A1 * | 3/2016 | Choyi | H04L 63/065 380/279 |

* cited by examiner

*Primary Examiner* — Duc C Ho
(74) *Attorney, Agent, or Firm* — McAndrews, Held & Malloy, Ltd.

(57) ABSTRACT

Systems and methods are disclosed for securing a network, for admitting new nodes into an existing network, and/or for securely forming a new network. As a non-limiting example, an existing node may be triggered by a user, in response to which the existing node communicates with a network coordinator node. Thereafter, if a new node attempts to enter the network, and also for example has been triggered by a user, the network coordinator may determine, based at least in part on parameters within the new node and the network coordinator, whether the new node can enter the network.

23 Claims, 7 Drawing Sheets

METHOD AND APPARATUS FOR MOCA NETWORK WITH PROTECTED SET-UP

CROSS-REFERENCE TO RELATED APPLICATIONS/INCORPORATION BY REFERENCE

This patent application makes reference to, claims priority to and claims benefit from U.S. Provisional Patent Application Ser. No. 62/068,621, filed on Oct. 24, 2014, and titled "Method and Apparatus for MoCA Network with Protected Set-Up." This patent application is also a continuation in-part of U.S. patent application Ser. No. 14/857,453, filed on Sep. 17, 2015, and titled "Method and Apparatus for MoCA Network with Protected Set-Up," which claims priority to and claims benefit from U.S. Provisional Patent Application Ser. No. 62/051,532, filed on Sep. 17, 2014, and titled "Method and Apparatus for MoCA Network with Protected Set-Up." This patent is also a continuation in-part of U.S. patent application Ser. No. 14/808,193, filed on Jul. 24, 2015, and titled "Method and Apparatus for MoCA Network with Protected Set-Up," which claims priority to and claims benefit from the U.S. Provisional Patent Application Ser. No. 62/028,317, filed on Jul. 24, 2014, and titled "Method and Apparatus for MoCA Network with Protected Set-Up." The entire contents of each of the above-mentioned patent applications and provisional patent applications are hereby incorporated herein by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Various communication networks, such as for example MoCA networks, lack a method and/or apparatus for securely, reliably, and efficiently adding a new node to the network. Limitations and disadvantages of conventional methods and systems for handling the addition of a new node to a network, for example a MoCA network, will become apparent to one of skill in the art, through comparison of such approaches with some aspects of the present methods and systems set forth in the remainder of this disclosure with reference to the drawings.

SUMMARY

Figure 1:
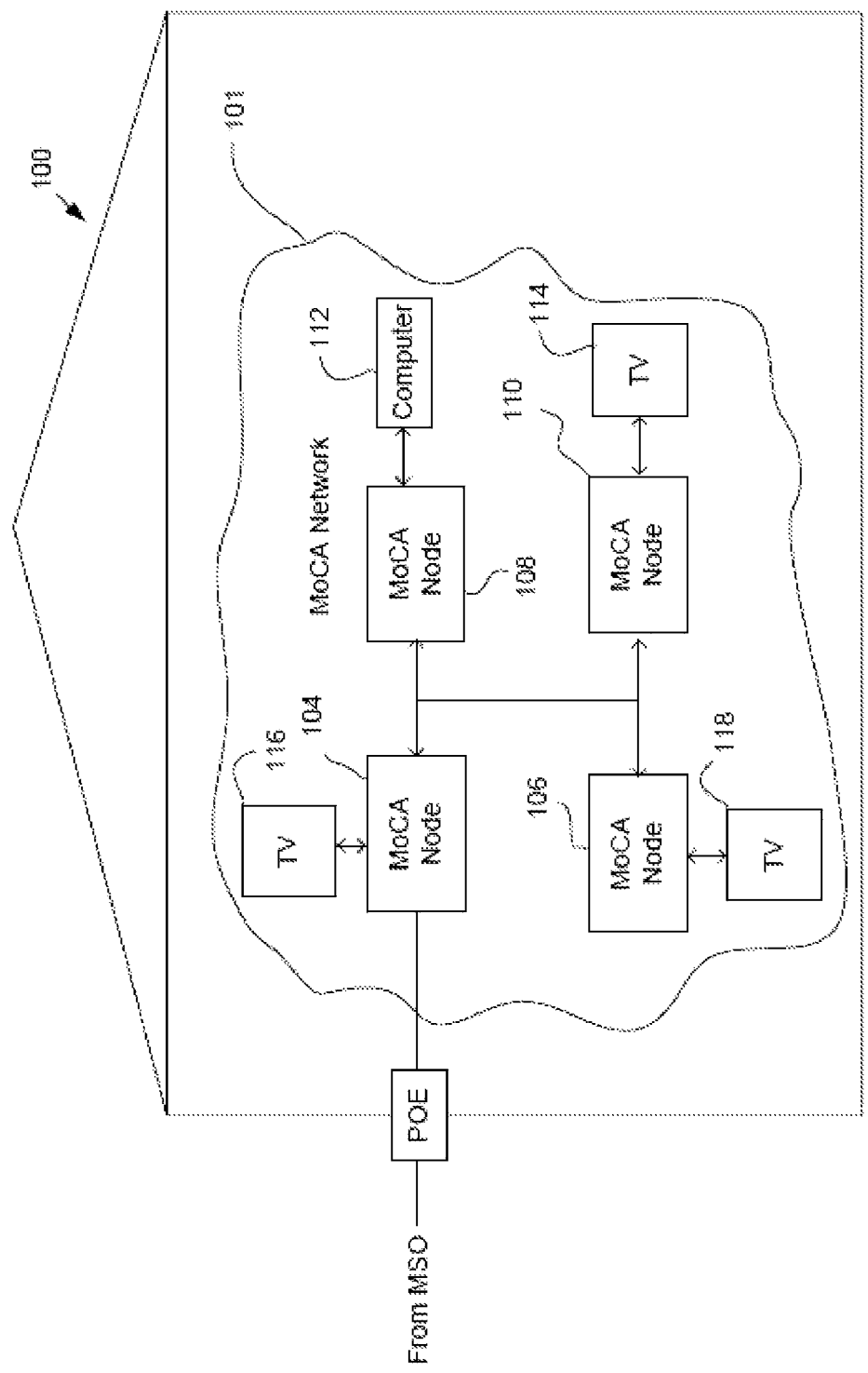
FIG. 1 shows a block diagram of a premises having a MoCA network.

Various aspects of this disclosure provide systems and methods for securing a network, for admitting new nodes into an existing network, and/or securely forming a new network. As a non-limiting example, an existing node may be triggered by a user, in response to which the existing node communicates with a network coordinator node. Thereafter, if a new node attempts to enter the network, and also for example has been triggered by a user, the network coordinator may determine, based at least in part on parameters within the new node and the network coordinator, whether the new node can enter the network.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

A premises (e.g., a home, office, campus, etc.) may comprise a communication network for the sharing of information between various devices within the premises. For example, entertainment content may be received through a wide area network (WAN) provided by an MSO (Multi-system Operator), such as a cable television operator or satellite content provider. Content provided to the premises may be distributed throughout the premises over entertainment premises-based network (e.g., a home entertainment network, general premises-based communication network, etc.). The premises-based network may, for example, comprise a local area network (LAN) in any of a variety of configurations, such as a mesh network. An example protocol for establishing a premises-based network, for example a home entertainment LAN, is defined by the well-known MoCA (Multi-media over Coax Alliance) network protocol that is in-use today.

FIG. 1 shows a block diagram of a premises 100 (e.g., a home, office, campus, etc.) having a MoCA network 101. The discussion here will generally provide examples in a MoCA network environment. It should be understood, however, that the scope of this disclosure is not limited to MoCA networks. In the example shown in FIG. 1, the MoCA network 101 receives content from an MSO at a MoCA Point of Entry (POE). The MoCA network 101 enables the content to be communicated to all of the MoCA nodes 104, 106 108, and 110 on the MoCA network 101. In the example shown in FIG. 1, the MoCA nodes 104, 106, 108, and 110 are coupled (e.g., communicatively coupled via any of a variety of types of communication links) to either a television or a computer. For example, the information that is present in the computer 112 can be formatted for and displayed on any of the televisions by sending Prioritized Quality of Service (PQoS) data streams from the computer 112 to one or more of the televisions 114, 116, and 118 via the associated MoCA nodes 104, 106, 108, and 110.

When setting up a premises-based network (e.g., a home entertainment network), network security may be a consideration. For example, in various scenarios, it may be beneficial to ensure that only those devices that are authorized to transmit and receive information over the network can do so. Network security may be accomplished in any of a variety of manners. For example, one way in which security may be maintained within a LAN is to ensure that only devices that have a network password can enter the network. Therefore, in order to gain access to the network, a device must generally gain access first to the password used to secure the network.

One example manner of allowing a new device, sometimes referred to as a New Node (NN) to enter a network is to require that a person who is installing the NN press a button on the NN and also on one of the nodes within the network to which the NN is attempting to gain access. This procedure ensures that only nodes that are being installed by someone who has physical access to at least one node of the network can gain access to the network. Accordingly, a person may press a button (or otherwise cause a trigger to occur, for example via a user interface device, remote control, etc.) within or on the NN. The person may then, for example, be required to walk over to one of the nodes of the network to which access is sought, and press a button (or otherwise cause a trigger to occur) within or on that node. When one of the nodes within the network recognizes that this procedure has been properly followed, one of the nodes of the network may then share the network password with the NN, thus allowing the NN to communicate with the other nodes of the network. Once the NN has the password, it can then gain admission to the network.

For various communication networks, for example MoCA networks and others, a secure manner in which new nodes are added to such networks has either not been established or has been established but is inadequate (e.g., inefficient, non-secure, etc.). Various aspects of the present disclosure thus provide systems and methods for securely adding new nodes to a network (e.g., a premises-based network).

In accordance with various aspects of the present disclosure, a NN can securely gain access to an existing network (e.g., a network for which at least two nodes have previously established communication with one another in accordance with a network protocol). In addition, various aspects of the present disclosure allow a NN to establish a new network with another node in a secure manner, which other nodes can then join, for example in accordance with various aspects of the present disclosure that provide for an NN to securely join an existing network.

In accordance with various aspects of the present disclosure, a NN may be powered on (or, for example, hard reset, etc.). The NN may then enter a listening phase during which the NN attempts to detect a Beacon signal. The Beacon signal may, for example, come from a network coordinator node of a previously established network. Also for example, the Beacon may come from another node that has not been able to find another node with which to establish a network and is currently seeking a second node with which to form a new network (e.g., a beaconing node). If the NN is triggered by a user prior to detecting a Beacon, the NN may, for example, set a PBState flag to "PUSHED" indicating that the NN was triggered. The NN may also start a timer or clock (e.g., a walking timer) and continue to search until either the timer expires, the NN detects a Beacon, or the NN starts to send Beacons while continuing to search (e.g., the listening phase ends). The walking timer is set to time out after the amount of time allotted to walk from one node to another (e.g., to trigger such node) has elapsed.

If the NN detects a Beacon prior to the walking time elapsing, then the NN may check whether a PBState flag is set to PUSHED (e.g., indicating that a network set-up session is underway, for example a network protected set-up). A Beacon may, for example, be sent by a network coordinator, access point, mesh member, or other type of network node. If the PBState flag is set to PUSHED, then the NN may, for example, send a message (e.g., a Pre-Admission Discovery Request Message) to the node that sent the Beacon. The NN may, for example, identify itself and send protected set-up parameters (e.g., MoCA Protected Set-up (MPS) Parameters in a MoCA network scenario) that indicate the privacy status set within the NN. The NN may then, for example, attempt (or wait) to receive a response to the sent message (e.g., wait to receive a Discovery Response Message in response to a Discovery Request Message). If the NN receives a response (e.g., a Discovery Response Message), the response may, for example, comprise protected set-up parameters of the responding node (e.g., MPS Parameters of a MoCA responding node). The NN may then, for example, check the privacy status of the responding node based on the protected set-up parameters received from the responding node and determine whether the two nodes are compatible to continue the process. If compatible, then the NN may, for example, exchange password information with the responding node. A decision may, for example, be made as to whether a password is required to be shared by the NN and the responding node. If so, a further decision may, for example, be made by the NN as to whether the NN provides the password to the responding node or whether the responding node provides the password to the NN. Alternatively, if the NN and the responding node are not compatible, then the attempt to establish a network between the two nodes may fail. In some cases, however, the NN may be able to gain admission to the network without a password exchange.

If the NN fails to detect a Beacon within a predetermined amount of time (e.g., a period of time longer then the walk time, for example as indicated by a variable $MPS_{WALK\_TIME}$), the NN may enter Beacon phase. Upon entering the Beacon phase, the NN may take on the role of a network coordinator (NC), which may also be referred to as a network controller, for example performing beaconing functionality and/or any other functionality associated with a network coordinator). Accordingly, during Beacon phase, the NC (formerly the NN) may transmit Beacon signals (or messages). If a receiving node is powered on, has been triggered, and detects the Beacon signals transmitted by the NC, then the receiving node may transmit a message (e.g., a Pre-Admission Discovery Request Message in a MoCA scenario). The NC may then send a response (e.g., a Discovery Response Message in a MoCA scenario) that includes protected set-up parameters of the NC (e.g., MPS Parameters of the NC in a MoCA scenario) and thus indicates the privacy status of the NC. The NC may then decide whether the privacy status of the two nodes is compatible. If so, the NC may further determine whether an exchange of passwords is necessary and/or how such an exchange of passwords is to take place.

In accordance with various aspects of the present disclosure, when an Existing Node (EN) (e.g., a node that is currently a member of a network) is triggered, the EN may ignore the trigger if its management parameter (e.g., $MPS_{EN}$ in a MoCA scenario) is set to DISABLE, or for example if a state flag (e.g., a PBState flag in a MoCA scenario) is set, indicating that the EN was previously triggered less than a predetermined time ago. However, if triggered and the management parameter (e.g., $MPS_{EN}$) of the EN is set to ENABLE and the state flag (e.g., PBState flag) is not set (or set to CLEAR), then the EN may send a request. In an example MoCA scenario, the request may, for example, be sent as an MPS Request Protocol Information Element (IE) within a Reservation Request (RR) to the Network Coordinator (NC) that controls the network of which the EN is a member.

In accordance with various aspects of the present disclosure, in an example MoCA scenario, an NC that receives a RR with a MPS request may check the status of the PBState flag. If the state of the PBState flag is CLEAR, then the PBState flag is set to PUSHED. In addition, a register called PBNode is loaded with a value that indicates the identity of the EN that sent the MPS request. A walk timer is then started within the NC. Then, in the next Media Access Plan (MAP), the NC includes a Network MPS Session Protocol IE indicating that the NC received the MPS request and identifying the node that sent the MPS request. If the walk timer times out before a Pre-Admission Discovery Request Message is received (e.g., from a NN), the MPS session is aborted, the PBState flag is set to CLEAR, and the walk timer is reset. When either the timer expires or the admission of the new node is complete or fails, the NC sends a message indicating that the MPS session has ended.

In accordance with various aspects of the present disclosure, the password exchange may comprise an M1 Request, an M2 Response, an M2 Acknowledge, an M3 Response and an M3 Acknowledge. Also in accordance with various aspects of the present disclosure, the password exchange may comprise transmission of a Discovery Response Message with an NC Public Key Network IE, a Network Password Message, and an acknowledgement of each.

Figure 2:
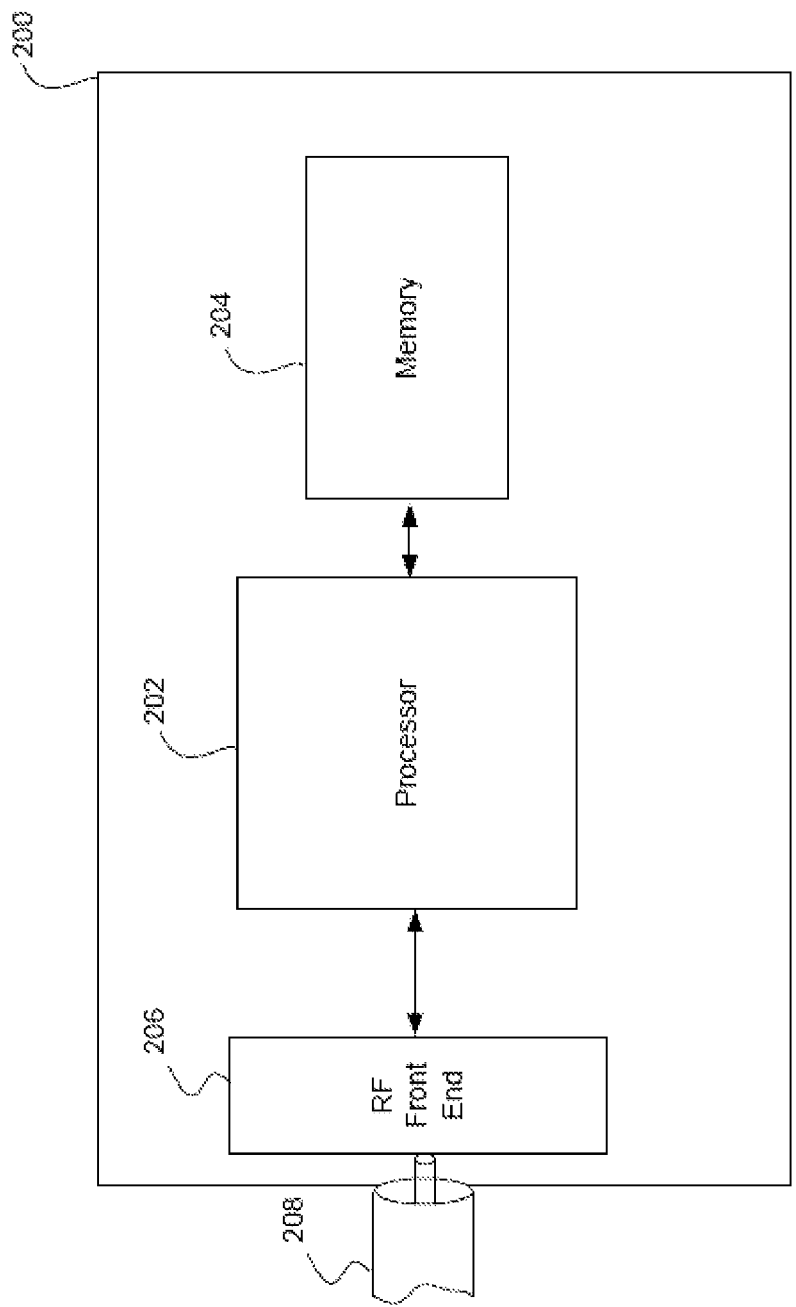
FIG. 2 shows an example block diagram of a network node, in accordance with various aspects of the present disclosure.

FIG. 2 shows an example block diagram of a network node 200, in accordance with various aspects of the present disclosure. The node 200 may, for example, share any or all characteristics with the MoCA nodes 104, 106, 108, and 110 shown in FIG. 1 and discussed herein. The node 200 comprises a processor 202, a memory 204 and a radio frequency (RF) front end 206. In the transmit path, the RF front end 206 receives information from the processor 202. The information is modulated on signals generated by the RF front end 206. The RF front end 206 transmits such signals over a medium 208, such as over coaxial cabling used to connect nodes of a MoCA network. In the receive path, the RF front end 206 also receives signals from the medium 208, demodulates the signals to retrieve the information communicated by such signals, and passes the received information to the processor 202 for processing. It should be understood that, while the example node 200 shown in FIG. 2 is described with respect to a node connected via coaxial cable, the node may be connected to the network over any medium, such as wireless connection, twisted pair, optical fiber or any other medium that can transport signals from node to node.

The processor 202 within the node 200 performs several tasks. The example node 200 is shown and described as having a single processor 202 that performs all of the disclosed tasks and functions of the node 200. Nonetheless, it should be understood that the disclosed tasks and functions of the node 200 can be performed by any combination of hardware, firmware and software. Furthermore, any software or firmware can be executed by one or a combination of several independent or coordinated processors. For example, in various example implementations, it may be more efficient to use processors dedicated to performing a particular task or group of tasks. Also for example, the processor 202 (or processors) may comprise any of a variety of processing circuits (e.g., general purpose processors, microcontrollers, application-specific integrated circuits, programmable state machine devices, analog and/or digital circuitry, etc.). Such architectural variations are understood. Accordingly, the details of such architectures are not provided herein for the sake of brevity and illustrative clarity.

As mentioned previously, various aspects of the present disclosure may herein be presented in the context of a MoCA network. It should be understood, however, that the scope of this disclosure is not limited to methods and apparatus of a MoCA network.

In accordance various aspects of the present disclosure, the node 200 may perform in one of at least three distinct roles, non-limiting examples of which are provided herein. Furthermore, the particular role taken on by the node 200 may depend upon the tasks the node 200 is performing and the environment in which the node 200 exists. In an example implementation, the node 200 is powered on (e.g., power is initially applied to the node to start the node 200 operating), the node 200 is subjected to a hard reset causing state information to be lost, etc. When initially powered on, the node 200 is unpaired. For example, the node 200 has no affiliation with any network. Also, in accordance with an example implementation, the node 200 may have a number of default settings that are relevant to the disclosed method and apparatus. For example, a privacy setting referred to as $PRIVACY_{EN}$ may be initially set to DISABLED. In addition, there may for example be a plurality of parameters that are associated with the MoCA Protected Set-up (MPS) function of the node 200. Four example parameters comprise:

$MPS_{EN}$: Initialized to ENABLED.
$MPS_{PRIVACY\_RECEIVE}$: Initialized to ENABLED.
$MPS_{PRIVACY\_DOWN}$: Initialized to DISABLED.
$MPS_{WALK\_TIME}$: Initialized to 2 minutes.

Initially, the node 200 may operate in the role of New Node (NN). For example, when the node 200 is initially turned on, it may enter a "Listening Phase". In the Listening Phase, the node 200 may, for example, attempt to detect (or listen for) a Beacon signal. For example, the RF front end 206, under the control of the processor 202, may search for a Beacon signal transmitted by another node that is operating on the medium 208 to which the node 200 is connected. If the node 200 does not detect a Beacon within a predetermined amount of time, the node 200 may then enter a "Beacon Phase". In the Beacon Phase, the node 200 may, for example, transmit Beacons for a period of time and also listen to see whether another node operating on the medium has detected and responded to the transmitted Beacons. The Listening Phase/Beacon Phase sequence may, for example, be repeated multiple times.

Once the node 200 joins a network (e.g., through a process illustrated by example herein), the node 200 operates in the role of Existing Node (EN). In accordance with the various aspects of the present disclosure, at least one node in each network generally assumes the role of Network Coordinator (NC). The NC may, for example, be responsible for scheduling most or all of the traffic on the network. Additional examples regarding the role of NC are provided herein. In accordance with various aspects of the present disclosure, the node 200 may operate in accordance with the MoCA standard.

Figure 3:
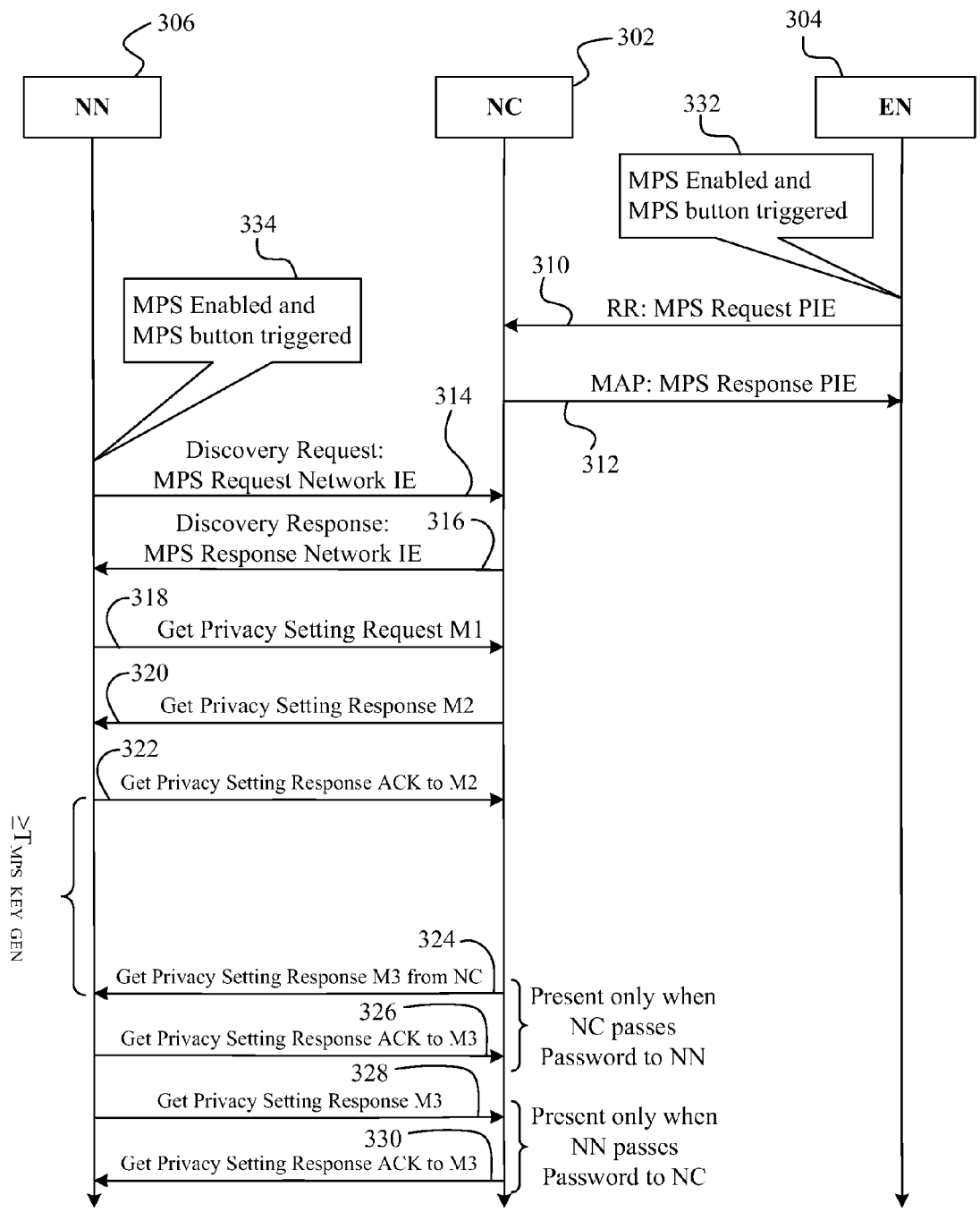
FIG. 3 shows example message exchange sequences, and functions and tasks performed by various nodes, in accordance with various aspects of the present disclosure.

FIG. 3 shows example message exchange sequences, and functions and tasks performed by various nodes (e.g., between nodes of a network and/or nodes to be part of a network), in accordance with various aspects of the present disclosure. For example, FIG. 3 provides an illustration of various functions and tasks performed by a node when operating in each of the three example roles (e.g., NN, EN and NC). Note that in FIG. 3, as an initial condition, a network has already been formed by an NC 302 and an EN 304. The diagram of FIG. 3 shows time flowing from the top of the diagram to the bottom, with horizontal arrows 310-330, arrows that are closer to the top of the diagram depicting communications that occur before communications depicted by arrows that are closer to the bottom of the diagram. Furthermore, the horizontal arrows indicate a communication in the direction of the arrow between nodes 302, 304, and 306.

The first event shown is a user pressing an MPS button 332 on the EN 304 with MPS enabled (e.g., the $MPS_{EN}$ parameter of the EN 304 is set to ENABLE). The user pressing the MPS button on the EN 304 results in the EN 304 sending an MPS Request Protocol Information Element (PIE) 310 within a Reservation Request (RR) Message. In an example implementation, the RR conforms to reservation requests sent in accordance with the MoCA standard, but the scope of various aspects of this disclosure is not limited thereto. TABLE 1 shows an example format of an MPS Request PIE.

TABLE 1

| MPS Request PIE Format | | |
|---|---|---|
| Field | Length | Explanation |
| FRAME_SUBTYPE | 4 bits | 0x6 - MoCA 2 Operation |
| FRAME_TYPE | 4 bits | 0x7 - Protocol IE |
| IE_LENGTH | 6 bits | = 0 |
| RESERVED | 2 bits | Type III |
| Protocol IE Payload | | |
| TYPE | 4 bits | 0xTBD - MPS Request from an EN |
| RESERVED | 12 bits | TYPE III |

Note that "0x" indicates that the value that follows is in hexadecimal format. Accordingly, the value 0x6 is equal to 0110 in binary format; the value 0x7 is equal to 0111 in binary format, etc. TBD indicates that the value is yet to be determined (e.g., the field is not yet assigned to carry any particular value). Any value that is not already assigned may be assigned for use in the future. Furthermore, it should be understood that each of the fields can be assigned to any value that has not previously been assigned to another function.

In response to the MPS request PIE 310 in the RR Message, the processor 202 within the NC 302 checks the status of the local parameter PBState. For the sake of brevity, throughout this disclosure it should be assumed that when functions are disclosed as being performed by a node, the processor 202 within the node, for example alone or in conjunction with other circuitry, is generally responsible for performing the function (e.g., data analysis function, decision function, data determining function, transmitting and/or receiving control function, etc.).

If the value of the local parameter PBState is CLEAR, the NC 302 updates the value of the local parameter PBState to PUSHED. In addition, the NC 302 sets the local parameter PBNode to the Node ID of the EN 304 that sent the MPS Request PIE 310. In an example implementation, the Node ID of the EN 304 is included in the RR Message sent by the EN 304. The NC 302 may also start a timer (e.g., an MPS walk timer). In an example implementation, in the next MAP Message to be transmitted by the NC 302, the NC 302 includes a Network MPS Session Protocol IE 312 with the parameter CODE set to 0x0 and the parameter REQUESTING_NODE_ID set to the value of the parameter PBNode. TABLE 2 shows an example format of an MPS Response PIE (e.g., the Network MPS Session PIE, etc.).

TABLE 2

Network MPS Session PIE format

| Field | Length | Explanation |
|---|---|---|
| FRAME_SUBTYPE | 4 bits | 0x6 - MoCA 2 Operation |
| FRAME_TYPE | 4 bits | 0x7 - Protocol IE |
| IE_LENGTH | 6 bits | = 0 |
| RESERVED | 2 bits | Type III |
| | | Protocol IE Payload |
| TYPE | 4 bits | 0xTBD - Network MPS Session |
| CODE | 4 bits | 0x0 - Network MPS session start. |
| | | 0x1 - Network MPS session stop. |
| | | Other values reserved. |
| REQUESTING_NODE_ID | 8 bits | The ID of the Node that the response is responding to |

Alternatively, if the value of the parameter PBNode is PUSHED, then the NC 302 checks whether the value of the parameter PBNode is equal to the value of the Node ID of the EN 304 that sent the MPS Request PIE 310. If so, then the NC 302 had previously received an MPS request from this EN 302. Accordingly, the NC 302 may ignore the received MPS request. However, in an example implementation, if the value of PBNode is different from the Node ID of the EN 304 that sent the MPS Request PIE 310, then the NC 302 may reset the walk timer and set the value of the parameter PBState to CLEAR. Accordingly, if a user triggers more than one EN, the second EN trigger may cause the MPS session to end. A new session might then, for example, only occur if the user activates a third trigger. The NC may, for example, end the session by sending a PIE with CODE equal to 0x1 in the next MAP Message after the second trigger from the different EN.

Similarly, if the walk timer expires (runs for longer than the allotted time) before the NC 302 receives a Pre-Admission Discovery Request Message from an NN 306, then the NC 302 may set the parameter PBState to CLEAR and reset the walk timer. In addition, the NC 302 may send an MPS Session Protocol IE having the field CODE set to 0x1 in the next MAP Message.

If the user triggers the NN 306 and the local management parameter MPS$_{EN}$ of the NN is ENABLED 334, the NN 306 may send a Pre-Admission Discovery Request Message comprising an MPS Request Network IE 314. TABLE 3 shows an example format of an MPS Request Network IE.

TABLE 3

MPS Request Network IE Format

| Field | Length | Value |
|---|---|---|
| | | IE Header |
| TYPE | 8 bits | 0x08- MPS Request Network IE |
| LENGTH | 8 bits | 0x02 |
| | | IE Payload |
| RESERVED | 12 bits | Type III |
| MPS_PARAMETERS | 4 bits | Bit 3 - Reserved |
| | | Bit 2 - Privacy. reflects the value of ActivePrivacyEN |
| | | 0b0 = Disabled |
| | | 0b1 = Enabled |
| | | Bit 1 - Receive Privacy. If PairedState = un-Paired: reflects the value of the Node's MPS$_{PRIVACY\_RECEIVE}$ |
| | | 0b0 = Disabled |
| | | 0b1 = Enabled |
| | | Is set to 0b0 if the PairedState = Paired. |
| | | Bit 0 = Downgrade Privacy. If Bit 1 is set to 0b1: reflects the value of the Node's MPS$_{PRIVACY\_DOWN}$ |
| | | 0b0 = Disabled |
| | | 0b1 = Enabled |
| | | Reserved Type III when Bit 1 = 0b0. |
| GUID | 64 bits | 64 bit MAC address of the device |

In response to the Discovery Request Message comprising the MPS Request Network IE 314, the NC 302 may schedule an Admission Control Frame (ACF) slot in the next Beacon during which the NC 302 transmits a Pre-Admission Discovery Response Message comprising an MPS Response Network IE 316 to the NN 302. TABLE 4 shows an example format of an MPS Response Network IE.

TABLE 4

MPS Response Network IE Format

| Field | Length | Value |
|---|---|---|
| | | IE Header |
| TYPE | 8 bits | 0x09- MPS Response Network IE |
| LENGTH | 8 bits | 0x02 |
| | | IE Payload |
| NODE_ID | 8 bits | The ID of the NC |
| CODE | 4 bits | 0x0 - MPS is disabled or not triggered. |
| | | 0x1 - Network MPS is triggered. |
| | | Other values reserved. |
| MPS_PARAMETERS | 4 bits | When CODE = 0x1: |
| | | Bit 3 - Reserved |
| | | Bit 2 - Privacy |
| | | 0b0 = Disabled |
| | | 0b1 = Enabled |
| | | Bit 1 - Receive Privacy |
| | | 0b0 = Disabled |
| | | 0b1 = Enabled |
| | | Bit 0 = Downgrade Privacy |
| | | 0b0 = Disabled |
| | | 0b1 = Enabled |
| | | Reserved Type III when Bit 1 = 0b0. |
| | | Otherwise: Reserved Type III |
| REQUESTING_NODE_GUID | 64 bits | This field is copied from the MPS Request Network IE that this response is responding to. |

In this example, the NC 302 sets the CODE field to 0x1, since the PBState of the NC is PUSHED. It should be noted that the PBState was set to PUSHED in response to the NC 302 receiving the RR Message from the EN 304 indicating that the EN 304 was triggered. Alternatively, the PBState may also be set to PUSHED if the NC is locally triggered. When the CODE field of the MPS Response Network IE 316 is set to 0x1 (e.g., when the NC 302 has either been triggered itself or has received an MPS request PIE indicating that an EN 304 has been triggered) the NC 302 may reset the walk timer. In addition, the status of various MPS Parameters may, for example, be provided by the NC 302 in the MPS Response Network IE 316 of the Discovery Response Message. Three example MPS Parameters are (1) Privacy; (2) Receive Privacy; and (3) Downgrade Privacy. The values of these three example MPS Parameters within the NN 306 (transmitted to the NC 302 in the MPS Request Network IE 314 of the Discovery Request Message), taken together with the values of the MPS Parameters within the NC 302, determine whether, and how, the nodes will exchange passwords. However, if the NC 302 is in a network, the Privacy parameter may indicate whether the network has privacy enabled or disabled. In this example case, Receive Privacy and Downgrade Privacy will be set to DISABLE.

These three example MPS parameters (e.g., Privacy) may, for example, indicate the privacy status of the node. It should be understood that when a node is operating as the NC of a network (e.g., there is at least one other EN in the network) and MPS is ENABLED, the node may be considered to be "PAIRED". Accordingly, the node may maintain a parameter PairedState set to PAIRED. In an example implementation, when a node is PAIRED, privacy of the node is set to the privacy of the network. In addition, no change to the node privacy can occur. More generally, a Node may be considered PAIRED if it either formed or joined a network (completed admission) at any time since the last time its state was set to un-Paired. Once the parameter PairedState is set to PAIRED, the parameter may for example remain in this state until the management entity resets the nodes MPS using $MPS_{RESET}$. If the management entity for a node resets PairedState to UNPAIRED, the node should update the parameter immediately, even if the node is currently in a network. The parameter should then remain in the UNPAIRED state until the node drops off the network.

procedure to ensure that the NN is entering a network of which the user approves.

The second of the three example parameters is Receive Privacy. When enabled, this parameter allows a node to receive the network password from another node. In addition, when enabled, the node state of the ActivePrivacyEN parameter can be changed during the MPS process. It should be understood that when a node is operating as the NC of a network (e.g., there is at least one other EN in the network), the password may be determined on a network wide basis. For example, in an example implementation, the NC 302 of a previously formed network cannot receive a password from another node. For example, once the password for a network has been established, it cannot be changed by an incoming NN. Accordingly, in an example implementation, the Receive Privacy parameter is always set to DISABLED when a node is admitted into a network (e.g., once the PairedStatus is set to PAIRED).

TABLE 5 provides an example MPS decision matrix that indicates the action to be taken by the network nodes 302, 304, 306, in accordance with various aspects of the present disclosure. These actions are based on the values of the MPS Parameters sent by the NC 302 in the MPS Response Network IE 316 of the Discovery Response Message and the MPS Parameters sent by the NN 306 in the MPS Request Network IE 314 of the Discovery Request Message.

TABLE 5

MPS Decision Matrix

| MPS_PARAMETERS Sent by NC | | | MPS_PARAMETERS Sent by NN | | | |
| --- | --- | --- | --- | --- | --- | --- |
| Bit 2 (Privacy) | Bit 1 (Receive Privacy) | Bit 0 (Downgrade Privacy) | Bit 2 (Privacy) | Bit 1 (Receive Privacy) | Bit 0 (Downgrade Privacy) | Decision |
| DISABLED | N/A | N/A | DISABLED | N/A | N/A | Node Privacy Admission |
| DISABLED | DISABLED | N/A | ENABLED | DISABLED | N/A | FAILED |
| DISABLED | DISABLED | N/A | ENABLED | ENABLED | DISABLED | FAILED |
| DISABLED | DISABLED | N/A | ENABLED | ENABLED | ENABLED | NC: Node Privacy Admission, NN: No Privacy Admission |
| N/A | ENABLED | N/A | ENABLED | DISABLED | N/A | NN to NC PSWD Exchange |
| DISABLED | ENABLED | N/A | ENABLED | N/A | N/A | NN to NC PSWD Exchange |
| ENABLED | DISABLED | N/A | DISABLED | DISABLED | N/A | FAILED |
| ENABLED | DISABLED | N/A | ENABLED | DISABLED | N/A | Node Privacy Admission |
| ENABLED | N/A | N/A | N/A | ENABLED | N/A | NC to NN PSWD Exchange |
| ENABLED | ENABLED | DISABLED | DISABLED | DISABLED | N/A | FAILED |
| ENABLED | ENABLED | ENABLED | DISABLED | DISABLED | N/A | NC: No Privacy Admission, NN: Node Privacy Admission |
| ENABLED | ENABLED | ENABLED | ENABLED | DISABLED | N/A | NN to NC PSWD Exchange |

The first of the three example parameters may, for example, indicate whether the node requires privacy. In an example implementation, if an NN 306 requires privacy, then the NN 306 can only join a network if the network has privacy enabled. However, the third example parameter (Downgrade Privacy), when enabled, may allow the NN 306 to enter a network for which privacy is disabled. For example, by allowing an NN to downgrade its privacy, the user can add the NN to the network without having to know the network password. Rather, the user may rely on the MPS There are six example decisions in the example MPS Decision Matrix of TABLE 5. The first example decision is that the NC sends a password to the NN (e.g., a password exchange from NC to NN). This occurs when, for example, the NC Privacy is ENABLED and the NN Receive Privacy is ENABLED. For example, when the NC has privacy enabled, it sends its password, and the NN can receive the password when NN Receive Privacy is ENABLED. In this case, none of the other MPS Parameters matter.

The second example decision is an NN to NC password exchange. In this case, Privacy in the NN 306 is ENABLED and Receive Privacy is ENABLED in the NC 302. Additionally, either the NN Receive Privacy is DISABLED or the NC Privacy is DISABLED. Alternatively, this may occur if all three parameters sent by the NC 302 are set to ENABLE, Privacy in the NN 306 is set to ENABLE and Privacy Receive in the NN is set to DISABLE. For example, in an example implementation, if an exchange from the NC to NN can occur, that exchange is favored over an NN to NC exchange. Therefore, if the NC Privacy is ENABLED and the NN Privacy Receive is ENABLED, the status of the NN Privacy and the NC Privacy Receive do not matter. In each other case in which the NN Privacy is ENABLED and the NC Privacy Receive is ENABLED, a password exchange from the NN to the NC will take place. It should be noted that, in an example implementation, the NC will only have Privacy Receive set to ENABLED when the NC is in Beacon phase and the PairedStatus is set to UNPAIRED. Once the PairedStatus is set to PAIRED, the Privacy Receive state is set to DISABLED, since a paired node cannot change its password.

The third example decision is Node Privacy Admission. In this case, no password exchange occurs, but the admission process takes place using the NN's and NC's ActivePrivacyEN and ActivePSWD parameter settings. In one example case, both the NC 302 and the NN 306 have Privacy DISABLED. Therefore, there is no need to exchange security information. In an alternative example case, Privacy is ENABLED in both NC and the NN, but Receive Privacy is DISABLED in both, so no downgrade is possible. Nonetheless, since the Privacy in both the NC and NN agree, the admission process can go forward without a password exchange.

The fourth example decision is NC: No Privacy Admission/NN: Node Privacy Admission. In this case, Privacy is ENABLED in the NC, but the Downgrade Privacy parameter in the NC 302 is also ENABLED, allowing the NC to downgrade its privacy to operate with an NN that has Privacy DISABLED and Receive Privacy set to DISABLED. Therefore, the NC ActivePrivacyEN parameter is set to DISABLED, while the $PRIVACY_{EN}$ parameter remains ENABLED. It should be noted that each node has both an ActivePrivacyEN parameter and a $PRIVACY_{EN}$ parameter. The ActivePrivacyEN parameter can be changed through the MPS process if MPS $Privacy_{down}$ parameter is ENABLED. In addition, the $ActivePrivacy_{EN}$ parameter can change from DISABLED to ENABLED if Privacy Receive is set to ENABLED.

The fifth example decision is similar to the fourth example decision. In this case, NN: No Privacy Admission/NC: Node Privacy Admission. This occurs, for example, if the NN Privacy is ENABLED, the Downgrade Privacy parameter in the NN 306 is also ENABLED, the NN Receive Privacy is set to ENABLED, and the NC Privacy and Receive Privacy are set to DISABLED. Accordingly, the NN can downgrade and set the ActivePrivacyEN parameter to DISABLED, thereby allowing the admission process to go forward with an NC that has privacy set to DISABLED.

It should be noted that Node Privacy Admission does not require a downgrade in the state of the ActivePrivacyEN. In contrast, No Privacy Admission occurs when a downgrade to the privacy is necessary, thus setting the value of ActivePrivacyEN to DISABLED while the value of $PRIVACY_{EN}$ remains ENABLED.

The sixth example decision is FAILED. There are four example instances in the Matrix of TABLE 5 when the MPS admission process will fail. In the first example instance, both the Privacy and Receive Privacy parameters in the NC 302 are DISABLED. In addition, the Privacy Parameter in the NN is ENABLED and the status of Receive Privacy is set to DISABLED. Because the state of Receive Privacy in the NN is DISABLED, the NN cannot downgrade the Privacy. Therefore, it is not possible for the NN to complete the admission process.

In the second example instance, both the NC Privacy and Receive Privacy parameters are DISABLED. However, Privacy is set to ENABLED in the NN. The Receive Privacy in the NN is set to ENABLED, but downgrade is DISABLED in the NN. Therefore, the NN cannot complete the admission process.

In the third example instance, the MPS parameters sent by the NC have Privacy set to ENABLED and Receive Privacy set to DISABLED. The NN has Privacy set to DISABLED, and Receive Privacy set to DISABLED, therefore, the NN cannot complete the admission process. The Receive Privacy in the NN is set to DISABLED, therefore no downgrade is possible.

In the fourth example instance, the MPS parameters sent by the NC have Privacy set to ENABLED and Receive Privacy set to ENABLED, but Downgrade Privacy is set to DISABLED. The NN has Privacy set to DISABLED and Receive Privacy set to DISABLED. Therefore, as noted above, the NN cannot change its Privacy setting to enter the secure network.

Looking once again at FIG. 3, after sending the MPS Response Network IE 316 in the Discovery Response Message, if the decision from TABLE 5 indicates that a password exchange is to take place, the NC 302 may, for example, schedule an ACF slot in the next Beacon with the ACF_TYPE field set to 0x0F and the ADDITIONAL_ACF-TYPE field set to 0x20. The NC 302 may then wait to receive a Get Privacy Setting Request M1 Message 318 from the NN 306 in the ACF slot. If, for any reason, the password exchange is not completed successfully, both the NC 302 and the NN 306 may set the PBState to CLEAR, and the NC 302 may send a Network MPS Session Protocol IE in a MAP with CODE set to 0x1 ending the MPS session. The NC 302 may then resume normal operation. The NN 306 should then, for example, continue searching for a network.

TABLE 6 shows an example format of a Get Privacy Setting Request M1 Message.

TABLE 6

Get Privacy Setting Request M1 Message Format

| Field | Length | Usage |
| --- | --- | --- |
| MPDU Header | | |
| TRANSMIT_CLOCK | 32 bits | This value is the scheduled time derived from the corresponding AU in the MAP. |
| PACKET_SUBTYPE | 4 bits | 0x7 - Get Privacy Setting Request M1 |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |
| PACKET_LENGTH | 16 bits | The total length of the MPDU frame body in bytes (excluding the MPDU header). |
| MPDU_CONTROL_INFORMATION | 32 bits | This field is Type III reserved. |

TABLE 6-continued

Get Privacy Setting Request M1 Message Format

| Field | Length | Usage |
|---|---|---|
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). |
| | | Frame Payload |
| DH_M1 | 1664 bits | N1 || $PK_{NN}$, where N1 and $PK_{NN}$ where $PK_{NN}$ Diffie-Hellman Public Key of the NN and N1: a 128-bit secret random number (nonce) generated by the NN |
| GUID | 64 bits | 64 bit MAC address of the requesting node |
| | | Payload FCS |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

If the NC 302 does not receive the Get Privacy Setting Request M1 Message 318 from the NN, it may schedule in the next Beacon an ACF slot with ACF_TYPE=0x0F and ADDITIONAL_ACF_TYPE=0x02 and retransmit the Pre-Admission Discovery Response Message 316 with the MPS Response Network IE in the ACF slot. In the following Beacon the NC 302 may then schedule another ACF slot for the Get Privacy Setting Request M1 Message 318 from the NN 306. The NC 302 may, for example, repeat the retransmission of the Discovery Response Message with MPS Response Network IE 316 and rescheduling of the Get Privacy Setting Request M1 Message 318 until it either receives the Get Privacy Setting Request M1 Message 318 from the NN 306 or it completes a predetermined number of repetitions. If, after the predetermined number of repetitions, the NC 302 has not received the Get Privacy Setting Request M1 Message 318, the NC 302 may then abort the MPS password exchange.

Upon reception of the Get Privacy Setting Request M1 Message 318, the NC 302 may schedule an ACF slot with ACF_TYPE=0x0F and ADDITIONAL_ACF_TYPE=0x21 and transmit a Get Privacy Setting Response M2 Message 320 to the NN 306. TABLE 7 shows an example format of a Get Privacy Setting Response M2 Message.

TABLE 7

Get Privacy Setting Response M2 Message Format

| Field | Length | Usage |
|---|---|---|
| | | MPDU Header |
| TRANSMIT_CLOCK | 32 bits | This value is the scheduled time derived from the corresponding AU in the MAP. |
| PACKET_SUBTYPE | 4 bits | 0x8 - Get Privacy Setting Response M2 |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |
| PACKET_LENGTH | 16 bits | The total length of the MPDU frame body in bytes (excluding the MPDU header). |
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. TheHEADER_FCS is calculated using CRC-16 ($x^{16} + x^{15} + x^2 + 1$). |
| | | Frame Payload |
| DH_M2 | 1664 bits | N2 || $PK_{NC}$, where N2 and $PK_{NC}$ where $PK_{NC}$: Diffie-Hellman Public Key of the NC and N2: a 128-bit secret random number (nonce) generated by the NC. |
| | | Payload FCS |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

After transmitting the Get Privacy Setting Response M2 Message 320, the NC 302 may, for example, schedule in the next Beacon an ACF slot with ACF_TYPE=0x0F and ADDITIONAL_ACF_TYPE=0x22. The NN 306 may then acknowledge the reception of M2 Response Message 320 by sending a Get Privacy Setting Response ACK Message 322. TABLE 8 shows an example format of a Get Privacy Setting Response ACK Message.

TABLE 8

Get Privacy Setting Response ACK Message Format

| Field | Length | Usage |
|---|---|---|
| | | MPDU Header |
| TRANSMIT_CLOCK | 32 bits | This value is the scheduled time derived from the corresponding AU in the MAP. |
| PACKET_SUBTYPE | 4 bits | 0xA - Get Privacy Setting Response Ack |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |
| PACKET_LENGTH | 16 bits | The total length of the MPDU frame body in bytes (excluding the MPDU header). |

TABLE 8-continued

Get Privacy Setting Response ACK Message Format

| Field | Length | Usage |
|---|---|---|
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). Frame Payload |
| RESERVED | 31 bits | Type III Payload FCS |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

If the NC 302 does not receive the Get Privacy Setting Response ACK 322 from the NN 306, it may schedule in the next Beacon an ACF slot with ACF_TYPE=0x0F and ADDITIONAL_ACF_TYPE=0x21 and retransmit the Get Privacy Setting Request M2 Message 320 in the ACF slot. In the following Beacon the NC 302 may then schedule another ACF slot for the Get Privacy Setting Response ACK 322 from the NN 306. The NC may, for example, repeat the retransmission of the Get Privacy Setting Request M2 Message 320 and the rescheduling of the Get Privacy Setting Response ACK 322 until it either receives the ACK 322 from the NN 306 or it completes a predetermined number of repetitions. If, after the predetermined number of repetitions, the NC 302 has not received the ACK 322, the NC 302 may abort the MPS password exchange.

If the Decision from TABLE 5 is to perform an NC to NN password exchange, then upon receiving the Get Privacy Setting Response ACK Message 322, the NC 302 transmits a Get Privacy Setting Response M3 Message 324 to the NN 306 at least a predetermined time (e.g., in an example implementation, equal to a parameter $T_{MPS\_KEY\_GEN}$) after the NC 302 receives the ACK Message 322. The Get Privacy Setting Response M3 Message 324 is transmitted in an ACF slot with ACF_TYPE=0x0F and ADDITIONAL_ACF_TYPE=0x23. TABLE 9 shows an example format of a Get Privacy Setting Response M3 Message.

TABLE 9

Get Privacy Setting Response M3 Message Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0x9 - Get Privacy Setting Response M3 |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |
| PACKET_LENGTH | 16 bits | The total length of the MPDU frame body in bytes (excluding the MPDU header). |
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). Frame Payload |
| DH_M3 | 328 bits | IV\|\| $ENC_{MPSKey}$(Password)\|\| $HMAC_{DHKey}$ (M1\|\|M2\|\|DH_M3*)(M1\|\|M2\|\|DH_M3*) where IV is a constant string (32 replications of 0xA concatenated), $ENC_{MPSKey}$(Password) is the encrypted Password which is calculated, and DH_M3*(= IV \|\| $ENC_{MPSKey}$(Password)) is the authenticator attribute. |
| RESERVED | 8 bits | Type III Payload FCS |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

After transmitting the Get Privacy Setting Response M3 Message 324, the NC 302 may, for example, schedule in the next Beacon an ACF slot with ACF_TYPE=0x0F and ADDITIONAL_ACF_TYPE=0x22. The NN 306 may then acknowledge the reception of the M3 Message 324 by sending a Get Privacy Setting Response ACK Message 326. TABLE 10 shows an example format of a Get Privacy Setting Response ACK Message.

TABLE 10

Get Privacy Setting Response ACK Message Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0xA - Get Privacy Setting Response Ack |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 |

TABLE 10-continued

Get Privacy Setting Response ACK Message Format

| Field | Length | Usage |
|---|---|---|
| PACKET_LENGTH | 16 bits | The total length of the MPDU frame body in bytes (excluding the MPDU header). |
| MPDU_CONTROL_INFORMATION | 32 bits | This field is Type III reserved. |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). Frame Payload |
| RESERVED | 31 bits | Type III Payload FCS |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

The NN 306 may, for example, use the new password it received from the NC 302 for network admission. The NN 306 may also report the parameter ACTIVE_PSWD=the new password to the management entity of the NN 306 and the parameter ACTIVE_PRIVACY$_{EN}$=Enabled if PRIVACY$_{EN}$ is configured as DISABLED by the management entity.

If the NC 302 does not receive the Get Privacy Setting Response ACK Message 326 from the NN 306, the NC 302 may schedule in the next Beacon an ACF slot with ACF_TYPE=0x0F and ADDITIONAL_ACF_TYPE=0x21 and retransmit the Get Privacy Setting Request M3 Message 324 in the ACF slot. In the following Beacon, the NC 302 may then schedule another ACF slot for the Get Privacy Setting Response ACK Message 326 from the NN 306. The NC 302 may, for example, repeat the retransmission of the Get Privacy Setting Request M3 Message 324 and the rescheduling of the Get Privacy Setting Response ACK Message 326 until it either receives the ACK 326 from the NN 306 or it completes a predetermined number of repetitions. If after the predetermined number of repetitions the NC 302 has not received the ACK 326, the NC 302 may abort the MPS password exchange.

If the Decision of TABLE 5 is to perform an NN to NC password exchange, then upon receiving the Get Privacy Setting Response ACK Message 322, the NC 302 may schedule an ACF slot with ACF_TYPE=0x0F and ADDITIONAL_ACF_TYPE=0x24. In accordance with an example implementation, the slot is scheduled for at least a value indicated by a variable TMPS_KEY_GEN after the NC 302 receives the ACK Message 322. The NN 306 may then transmit a Get Privacy Setting Response M3 Message 328 in the scheduled ACF slot. An example format of the Get Privacy Setting Response M3 Message 328 is shown in TABLE 9.

If the NC 302 does not receive the Get Privacy Setting Response M3 Message 328 from the NN 306, the NC 302 may schedule another ACF slot for the M3 Message from the NN 306 in the next Beacon. If, after rescheduling the Get Privacy Setting Response M3 Message 328 a predetermined number of times, the NC 302 has not received the M3 Message 328 from the NN 306, the NC 302 may abort the MPS password exchange.

After receiving the Get Privacy Setting Request M3 Message 328, the NC 302 may transmit a Get Privacy Setting Response ACK Message 330 in the next ACF slot with ACF_TYPE=0x0F and ADDITIONAL_ACF_TYPE=0x25 to acknowledge the reception of M3 Message 328. An example format of the Get Privacy Setting Response ACK Message 330 is shown in TABLE 10. The NC 302 may then, for example, start to use the new Privacy setting for network admission. The NC 302 may also report the parameter ACTIVE_PSWD=the new password to the management entity of the NC 302 and the parameter ACTIVE_PRIVACY$_{EN}$=Enabled if PRIVACY$_{EN}$ is configured as DISABLED by the management entity.

Various example messages discussed herein may comprise Diffie-Hellman security information, non-limiting examples of which are presented herein. It should be noted that any of a variety of alternative types of security information may be communicated without departing from the scope of this disclosure.

In accordance with an example implementation, the following parameters and notations are defined for the Diffie-Hellman Exchange:

"A" is a secret number randomly selected by NN.
"B" is a secret number randomly selected by the NC.
"g" is a generator for the Diffie-Hellman exchange. The value g is known to the public.
"P" is a prime for the Diffie-Hellman exchange. The value of P is known to the public.
"N1" is a 128-bit secret random number ("nonce") generated by the NN.
"N2" is a 128-bit secret random number ("nonce") generated by the NC.
"PK$_{NN}$" is a Diffie-Hellman Public Key of the NN.
"PK$_{NC}$" is a Diffie-Hellman Public Key of the NC.
"DHKey" is a Diffie-Hellman Shared Key.
"MPSKey" is an authentication key derived from DHKey, the nonces N1 and N2, and the NN's MAC address.
"||" denotes a concatenation operation.

In an example implementation in which the nodes are MoCA nodes operating in accordance with MoCA 2.1, the MPS operation uses 1536-bit Modular Exponential (MODP) Group for Diffie-Hellman Exchange.

The prime n p is: $2^{1536} - 2^{1472} - 1 + 2^{64} * \{[2^{1406} pi] + 741804\}$. Its hexadecimal value is:

| | | | | | |
|---|---|---|---|---|---|
| FFFFFFFF | FFFFFFFF | C90FDAA2 | 2168C234 | C4C6628B | 80DC1CD1 |
| 29024E08 | 8A67CC74 | 020BBEA6 | 3B139B22 | 514A0879 | 8E3404DD |
| EF9519B3 | CD3A431B | 302B0A6D | F25F1437 | 4FE1356D | 6D51C245 |
| E485B576 | 625E7EC6 | F44C42E9 | A637ED6B | 0BFF5CB6 | F406B7ED |
| EE386BFB | 5A899FA5 | AE9F2411 | 7C4B1FE6 | 49286651 | ECE45B3D |
| C2007CB8 | A163BF05 | 98DA4836 | 1C55D39A | 69163FA8 | FD24CF5F |

| | | | | | |
|---|---|---|---|---|---|
| 83655D23 | DCA3AD96 | 1C62F356 | 208552BB | 9ED52907 | 7096966D |
| 670C354E | 4ABC9804 | F1746C08 | CA237327 | FFFFFFFF | FFFFFFFF |

The generator g is 2.

In accordance with an example implementation, the NN and NC randomly generate the secret values A and B, respectively. In one such example implementation, A and B are at least 3072 bits. The Diffie-Hellman Public Keys are calculated as:

$$PK_{NN}=g^A \bmod p \text{ and } PK_{NC}=g^B \bmod p.$$

In an example implementation, the NN and the NC randomly generate the nonces N1 and N2 and exchange their nonces as well as the Diffie Hellman Public Keys. The NN then calculates the Diffie-Hellman Shared Key as:

$$DHKey=SHA-256(PK_{NC}^A \bmod p).$$

The NC calculates the Diffie-Hellman Shared Key as:

$$DHKey=SHA-256(PK_{NN}^B \bmod p).$$

Both the NN and the NC calculate the MPS Key as:

$$MPS_{Key}=\text{the first 128 bits of HMAC-SHA-256(DH-Key,N1||NNMAC||N2)},$$

where NNMAC is the 6-byte MAC address of the NN.

In accordance with an example implementation in which the network operates in accordance with MoCA, the Network Password length is 12 to 17 decimal digitals (96~136 bits). In an alternative example implementation, the password may be longer. To encrypt a Password during a MPS session, the sender of the Password first appends zeros to the end of the Password to make it 136 bits and then encrypt it using AES-128 with $MPS_{key}$ as the key.

Figure 4:
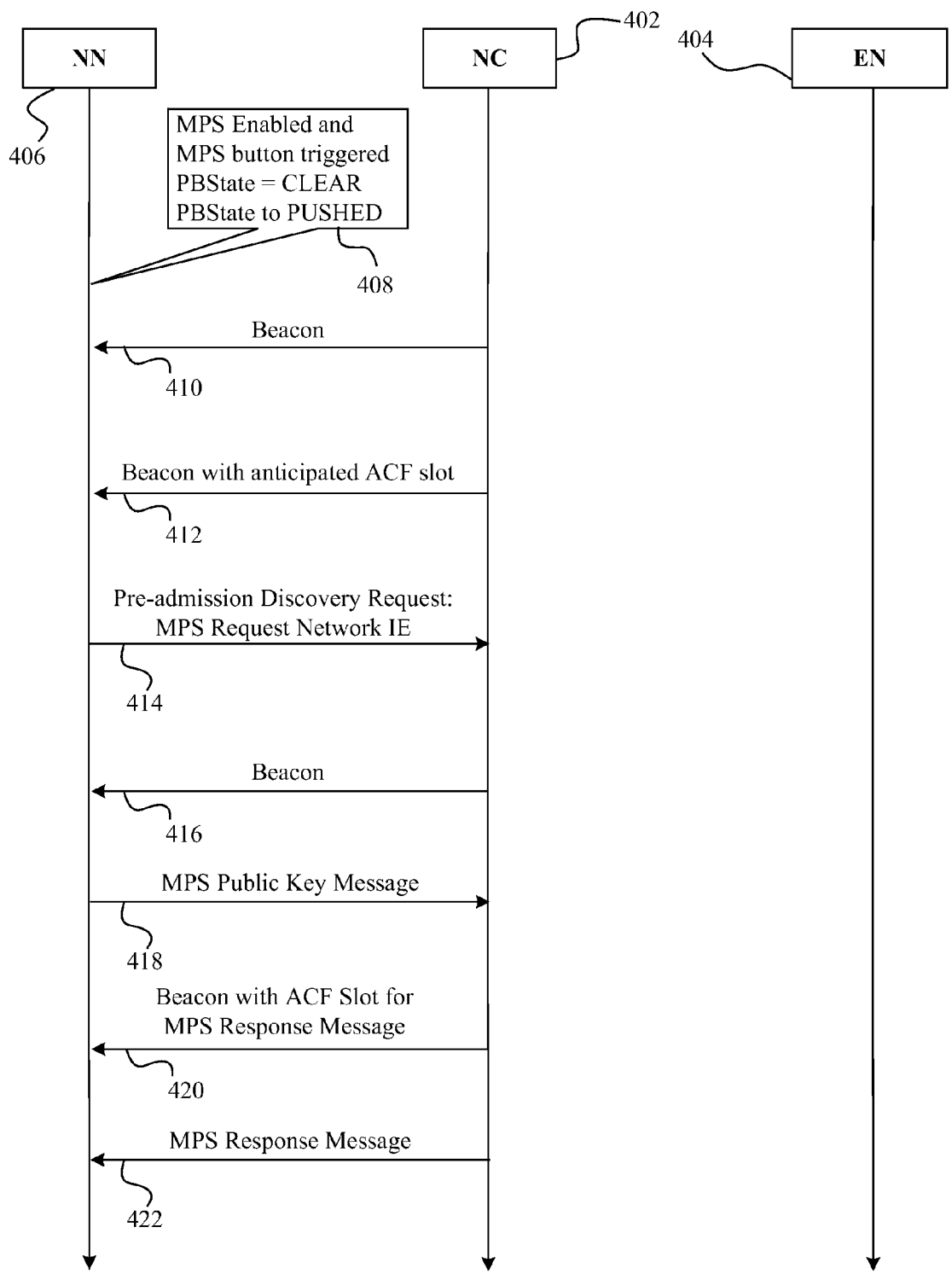
FIG. 4 shows example message exchange sequences, and functions and tasks performed by various nodes, in accordance with various aspects of the present disclosure.

FIG. 4 shows example message exchange sequences, and functions and tasks performed by various nodes, in accordance with various aspects of the present disclosure. In the example of FIG. 4, each node, NN 406, EN 404, NC 402 (or other beaconing node), may for example maintain the following local variables in addition to those that a node would normally maintain (e.g., in accordance with its operating protocol, for example the MoCA 2.0 specification). Similar to the example shown in FIG. 3, in the example shown in FIG. 4, each node may maintain a PBState local variable, a PairedState local variable, an $ACTIVE\_PRIVACY_{EN}$ configuration parameter, an ACTIVE_PSWD configuration parameter and a PBNode local variable. However, in addition to such example local variables, nodes operating in accordance with the example aspects shown in FIG. 4 may also maintain an MPSReqRx local variable, a HashedPublicKey local variable, and an MPSReqCTC local variable. The MPSReqRx local variable may, for example, be set to either "YES" or "NO." Initially, the value may be set to NO. The value of the HashedPublicKey local variable may, for example, be set to a hash value of the Diffie Hellman Public Key derived by an NN sending an MPS Request Network IE to an NC with MPSReqRx is set to NO. This example is described in more detail herein.

The following may, for example, apply to an NN 406 in one of the following example states. In a first example state, the NN 406 has been recently powered up, but has not yet either joined a network or moved to the Beacon Phase. The Beacon Phase may, for example, be the state in which the node starts to send out Beacons in an attempt to form a new network. In a second example state, the NN 406 is in the Beacon Phase, and the NN 406 is not sending a Beacon nor attempting to admit another node to form a network.

In this case, in an example implementation, if an MPS triggering event occurs (e.g., the user pushes the MPS button on the NN 406) with the NN MPS enabled, the NN 406 may check the state of the PBState local variable. If the PBState local variable has been set to PUSHED (not shown in FIG. 4), then the NN 406 will ignore the triggering event. However, if the value of the local variable PBState has not been set to PUSHED (e.g., the variable is set to CLEAR) 408, then the NN 406 will set the PBState local variable to PUSHED, start an MPS timer (e.g., a walk timer), and start or restart its network search process. If the timer reaches $MPS_{WALK\_TIME}$, then the NN 406 may set the local variable PBState to CLEAR and reset the MPS timer.

If, however, the NN 406 detects a Beacon from the NC 402 prior to the timer reaching $MPS_{WALK\_TIME}$, and PBState is equal to CLEAR (a condition not shown in FIG. 4), then the NN 406 may assume that there is currently no MPS session in progress. Accordingly, the NN 406 may perform node admission in a conventional manner. If during the node admission process with PBState equal to CLEAR, an MPS trigger event occurs, the NN 406 may abort the admission process and restart the network search (not shown in FIG. 4).

Alternatively, if the local variable PBState of the NN 406 is set to PUSHED when the NN 406 detects a Beacon 410, then the NN 406 may wait for a Beacon 412 that schedules an ACF slot for a Pre-Admission Discovery Request. If a Beacon 412 is received that has scheduled the anticipated ACF slot within a predetermined amount of time, the NN 406 may, during that ACF slot, send a Pre-Admission Discovery Request Message with an MPS Request Network IE 414. TABLE 11 shows an example format of an MPS Request Network IE.

TABLE 11

MPS Request Network IE Format

| Field | Length | Value |
|---|---|---|
| | | IE Header |
| TYPE | 8 bits | 0x09- MPS Request Network IE |
| LENGTH | 8 bits | 0x03 |
| | | IE Payload |
| RESERVED | 12 bits | Type III |
| MPS_ PARAMETERS | 4 bits | Bit 3 - Type III Reserved<br>Bit 2 - Privacy. MUST reflect the value of $ACTIVE\_PRIVACY_{EN}$<br>0b0 = Disabled<br>0b1 = Enabled<br>Bit 1 - Receive Privacy. If PairedState = un-Paired: MUST reflect the value of $MPS_{PRIVACY\_RECEIVE}$<br>0b0 = Disabled<br>0b1 = Enabled<br>MUST be set to 0b0 if the PairedState = Paired.<br>Bit 0 = Downgrade Privacy. If Bit 1 is set to 0b1: MUST reflect the value of the Node's $MPS_{PRIVACY\_DOWN}$<br>0b0 = Disabled |

TABLE 11-continued

MPS Request Network IE Format

| Field | Length | Value |
|---|---|---|
| HASHED_PUBLIC_KEY | 96 bits | 0b1 = Enabled<br>Reserved Type III when Bit 1 = 0b0.<br>The 96 MSB of SHA-256(256-bit Public Key generated by the NN ∥ 64-bit MAC address of the NN ∥ (32-bit TRANSMIT_CLOCK + 18-bit ACF_POINTER) mod $2^{32}$), where TRANSMIT_CLOCK AND ACF_POINTER are the fields in the Beacon that scheduled this Discovery Request. |

The NN 406 may load the NN's MPS parameters into the MPS_PARAMETER field. The HASHED_PUBLIC_KEY field may, for example, carry a hash value of the concatenation of the NN's Diffie Hellman Public Key, the MAC address, and the scheduled transmission time of the Pre-admission Discovery Request Message 414 (and/or any other dynamic value coming from the NC).

Assuming that the NN 406 receives a Beacon 412 indicating that an ACF slot has been scheduled by the NC 402 and the NN 406 sends the Pre-Admission Discovery Request 414, the NN 406 may, for example, monitor the ACF slot scheduled in the next Beacon 416 to see whether the NC 402 has scheduled an ACF slot for an MPS Public Key Message 418 to be sent by the NN 406. If the next ACF slot is scheduled for the MPS Public Key Message 418 to be sent by NN 406, the NN 406 may transmit an MPS Public Key Message 418 to the NC 402. TABLE 12 shows an example format of an MPS Public Key Message. The NN 406 may, for example, load the NN's GUID into the REQUESTING_NODE_GUID field and the 256-bit Diffie Hellman Public Key into the ECDH_PUBLIC_KEY field.

TABLE 12

MPS Public Key Frame Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0x7 - MPS Message |
| PACKET_TYPE | 4 bits | 0x9 - Link control II |
| VERSION | 8 bits | 0x10 |
| RESERVED | 8 bits | |
| SOURCE_NODE_ID | 8 bits | 0x00 or the NC node ID |
| RESERVED | 8 bits | |
| DESTINATION_NODE_ID | 8 bits | 0x3F - Broadcast or 0x00 |
| PACKET_LENGTH | 16 bits | The total length of the MPDU frame body in bytes (excluding the MPDU header). |
| MPDU_CONTROL_INFORMATION | 32 bits | RESERVED |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). |
| Frame Payload | | |

TABLE 12-continued

MPS Public Key Frame Format

| Field | Length | Usage |
|---|---|---|
| TYPE | 4 bits | 0x0 - MPS Public Key |
| RESERVED | 28 bits | Type III |
| ECDH_PUBLIC_KEY | 256 bits | ECDH Public Key |
| REQUESTING_NODE_GUID | 64 bits | 64-bit MAC address of the device if this Message is sent by the NN; the field is copied form the last MPS Response if this Message is sent by the NC<br>Payload FCS |
| PAYLOAD_FCS | 32 bits | The 96 MSB of SHA-256(256-bit Public Key generated by the NN ∥ 64-bit MAC address of the NN ∥ (32-bit TRANSMIT_CLOCK + 18-bit ACF_POINTER) mod $2^{32}$), where TRANSMIT_CLOCK AND ACF_POINTER are the fields in the Beacon that scheduled this Discovery Request. |

The NN 406 may then monitor the ACF slot scheduled in the next Beacon 420 to see whether an MPS Response Message will be sent from the NC 402. If the NN 406 does not receive the response from the NC 402 in the next ACF slot 416, the NN 406 may retransmit the Pre-admission Discovery Request Message. (not shown in FIG. 4).

If, however, the NN 406 receives an MPS Response Message 422 from the NC 402 in the next ACF slot, the NN 406 may determine the value of the CODE field of the MPS Response Message 422. If the value of the CODE field is 0x0 (e.g., indicating that the NC 402 either has MPS disabled or the NC 402 has not been triggered), the NN 406 may conclude that the admission was not successful and may continue searching for a network. Alternatively, if the value of the CODE field is 0x1 (e.g., indicating MPS is enabled and the NC 402 has been triggered), the NN 406 may reset the MPS timer and use the values of the MPS_PARAMETERS that the NN 406 sent to the NC 402 to determine how to proceed, for example based on the Decision Matrix of TABLE 5.

If the Decision Matrix of TABLE 5 indicates "Node Privacy Admission", then the NN 406 may continue node admission using the NN's active privacy settings. If the Decision Matrix indicates "FAILED", then the NN 406 may conclude that the admission was not successful and continue the network search. The NN 406 may also report the pairing failure to its management entity using the $MPS_{PAIR\_FAILED}$ parameter. In addition, the NN 406 may set the PBState to CLEAR.

If the Decision Matrix indicates "No Privacy Admission", then the NN 406 may set the $ACTIVATE\_PRIVACY_{EN}$ local variable to DISABLE, report the $ACTIVATE\_PRIVACY_{EN}$ local variable to the NN's management entity and continue to node admission.

If the Decision Matrix indicates "NC to NN PSWD Exchange", then the NN 406 may perform an MPS PSWD exchange during which the NC 402 provides the password to the NN 406.

If Decision Matrix indicates "NN to NC PSWD Exchange" the NN 406 may perform an MPS PSWD exchange during which the NN 406 provides the password to the NC 402.

The NN 406 may, for example, set the local variable PBState to CLEAR when it completes the admission process. If, however, the admission fails, the NN 406 may also set the local variable PBState to CLEAR, for example as soon as the NN 406 aborts the admission process.

Figure 5:
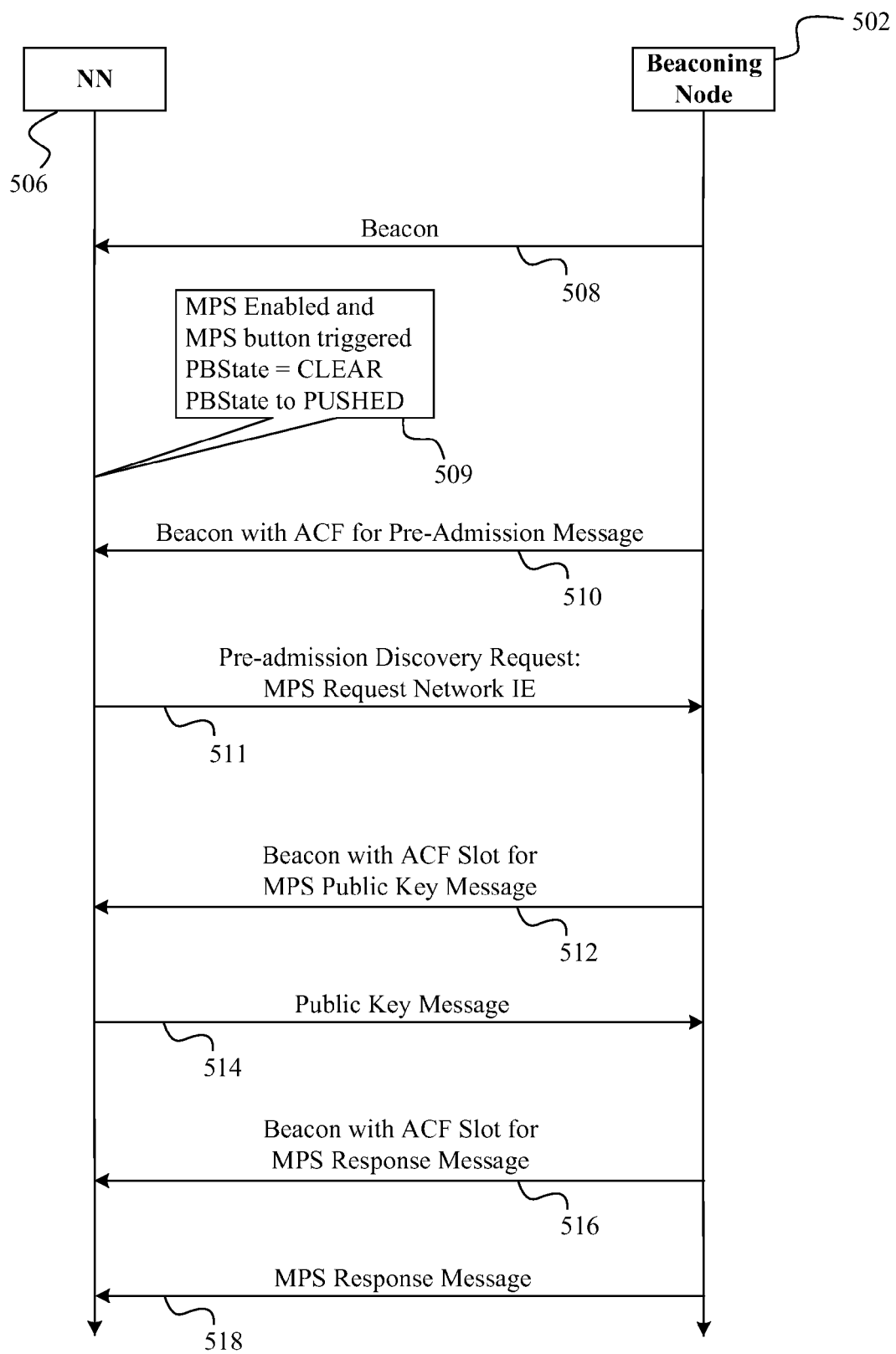
FIG. 5 shows example message exchange sequences, and functions and tasks performed by various nodes, in accordance with various aspects of the present disclosure.

FIG. 5 shows example message exchange sequences, and functions and tasks performed by various nodes, in accordance with various aspects of the present disclosure. Such operation may, for example, be performed by various nodes when operating in a Beacon Phase of a network search, but the scope of the present disclosure is not limited thereto.

If an MPS trigger event occurs in a node that is in the Beacon Phase and sending Beacons 509, the beaconing node 502 may check the status of the $MPS_{EN}$ local variable and the PBState local variable. If the PBState local variable is set to PUSHED or the $MPS_{EN}$ local variable is set to DISABLE, the beaconing node 502 may for example ignore the MPS trigger event. However, if the PBState local variable is set to CLEAR and the $MPS_{EN}$ local variable is set to ENABLE 508, the beaconing node 502 may for example start an MPS timer and restart its network search (e.g., leave Beacon Phase). If the MPS timer reaches the value $MPS_{WALK\_TIME}$ the node 502 will set PBState to CLEAR and reset the MPS timer.

Alternatively, if the beaconing node 502 receives a Pre-Admission Discovery Request Message with an MPS Request Network IE 511 from an NN 506 during an ACF slot scheduled by the Beacon 509, the beaconing node 502 will schedule an Admission Control Frame (ACF) slot in the next Beacon 512 during which the NN 520 sends an MPS Public Key Message 514.

In response to the MPS Public Key Message 514 from the NN 506, the beaconing node 502 schedules an Admission Control Frame (ACF) slot in the next Beacon 516 during which the beaconing node 502 transmits a MPS Response Message 518 to the NN 502. TABLE 13 shows an example format of an MPS Response Message.

TABLE 13

MPS Response Frame Format

| Field | Length | Usage |
|---|---|---|
| MPDU Header | | |
| TRANSMIT_ CLOCK | 32 bits | This value is the scheduled time derived from the corresponding AU in the MAP. |
| PACKET_ SUBTYPE | 4 bits | 0x7 - MPS Message |
| PACKET_TYPE | 4 bits | 0x9 - Link control II |
| VERSION | 8 bits | 0x10 |
| RESERVED | 8 bits | |
| SOURCE_ NODE_ID | 8 bits | The NC node ID |
| RESERVED | 8 bits | |
| DESTINATION_ NODE_ID | 8 bits | 0x00 |
| PACKET_ LENGTH | 16 bits | The total length of the MPDU frame body in bytes (excluding the MPDU header). |
| MPDU_ CONTROL_ INFORMATION | 32 bits | RESERVED |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). |

TABLE 13-continued

MPS Response Frame Format

| Field | Length | Usage |
|---|---|---|
| Frame Payload | | |
| TYPE | 4 bits | 0x1 - MPS Response |
| CODE | 4 bits | 0x0 - MPS is disabled or not triggered. 0x1 - Network MPS is triggered. Other values reserved. |
| RESERVED | 20 bits | Type III |
| MPS_ PARAMETERS | 4 bits | When CODE = 0x1: Bit 3 - Type III Reserved Bit 2 - Privacy. MUST reflect the value of $ACTIVE\_PRIVACY_{EN}$ 0b0 = Disabled 0b1 = Enabled Bit 1 - Receive Privacy. If PairedState = un-Paired, MUST reflect the value of $MPS_{PRIVACY\_RECEIVE}$ 0b0 = Disabled 0b1 = Enabled MUST be set to 0b0 if the PairedState = Paired. Bit 0 - Downgrade Privacy. If Bit 1 is set to 0b1, MUST reflect the value of $MPS_{PRIVACY\_DOWN}$ 0b0 = Disabled 0b1 = Enabled Reserved Type III if Bit 1 = 0b0. When CODE != 0x1: Reserved Type III |
| REQUESTING_ NODE_GUID | 64 bits | This field is copied from MPS request that this response is responding to. Payload FCS |
| PAYLOAD_FCS | 32 bits | The 96 MSB of SHA-256(256-bit Public Key generated by the NN ∥ 64-bit MAC address of the NN ∥ (32-bit TRANSMIT_CLOCK + 18-bit ACF_POINTER) mod $2^{32}$), where TRANSMIT_CLOCK AND ACF_POINTER are the fields in the Beacon that scheduled this Discovery Request. |

If the PBState local variable in the node 502 is set to PUSHED, the node 502 will check the state of the MPSReqRx local variable, the value sent in the HASHED_PUBLIC_KEY field of MPS Request Network IE 511, and the REQUESTING_NODE_GUID field and the ECDH_PUBLIC_KEY field sent in the Public Key Message to determine the value to set the CODE field. The node 502 will calculate the 96 MSB of SHA-256(256-bit ECDH_PUBLIC_KEY∥64-bit REQUESTING_NODE_GUID∥MPSReqCTC), where ∥ is the concatenation operation, and compare the result to the parameter HashedPublicKey. If the calculated value is not equal to the parameter HashedPublicKey, then the CODE field is set to 0x0. Otherwise, the CODE field is set to 0x1.

Bit 2 of the MPS_PARAMETER field in the Discovery Response 518 is set to reflect the value of the node's $ACTIVE\_PRIVACY_{EN}$ configuration parameter. Bit 1 of the MPS_PARAMETER field in the response 518 is set to 0b0 if the value of PairedState is PAIRED. However, if the value of PairedState is set to UNPAIRED, bit 1 will reflect the value of the Node's $MPS_{PRIVACY\_RECEIVE}$ configuration parameter. If bit 1 of the MPS_PARAMETER field in the response 518 is set to 0x1, then bit 0 of the MPS_PARAMETER field in the response 518 may be set to reflect the value of the node's $MPS_{PRIVACY\_DOWN}$ configuration parameter.

If the CODE field in the Discovery Response 518 is set to 0x0 and the MPSReqRx is set to NO, then the node 502 may start an MPS timer, set the MPSReqRx value to YES, set HashedPublicKey to the value of HASHED_PUBLIC_KEY in the MPS Request Network IE, and calculate MPSReqCTC as follows: MPSReqCTC=(32-bit TRANSMIT_CLOCK+18-bit ACF_POINTER) mod $2^{32}$, where TRANSMIT_CLOCK and ACF_POINTER are the fields of the Beacon that scheduled the Pre-admission Discovery Request. Alternatively, if the CODE field of the response 514 is set to 0x0, but the MPSReqRx is set to YES, the node 502 will continue normal operation and no action will be taken.

If the CODE field of the Discovery Response 518 is set to 0x1, the node 502 will reset the MPS timer and use the Decision Matrix of TABLE 5 to determine how to proceed.

If Decision Matrix indicates "Node Privacy Admission" the node 502 will perform node admission using the Node's privacy settings (ACTIVE_PRIVACY$_{EN}$ and ACTIVE_PSWD).

If Decision Matrix indicates "Failed" the node 502 will set PBState to CLEAR, set MPSReqRx to NO, report the pairing failure to the management entity using MPS$_{PAIR\_FAIL}$, and continue normal operation.

If Decision Matrix indicates "No Privacy Admission", the node 502 will set ACTIVE_PRIVACY$_{EN}$ to DISABLED, report ACTIVE_PRIVACY$_{EN}$=DISABLED to the management entity, and continue to node admission.

If Decision Matrix indicates "NC to NN PSWD Exchange", the node 502 will continue to MPS PSWD exchange, during which the Node will provide the password to the NN.

If Decision Matrix indicates "NN to NC PSWD Exchange", the node 502 will continue to MPS PSWD exchange, during which the NN will provide the password to the node 502.

The node 502 will set PBState to CLEAR upon completing the admission of the NN 506. Alternatively, if admission fails, the node 502 will set PBState to CLEAR as soon as the node 502 stops the admission process.

Figure 6:
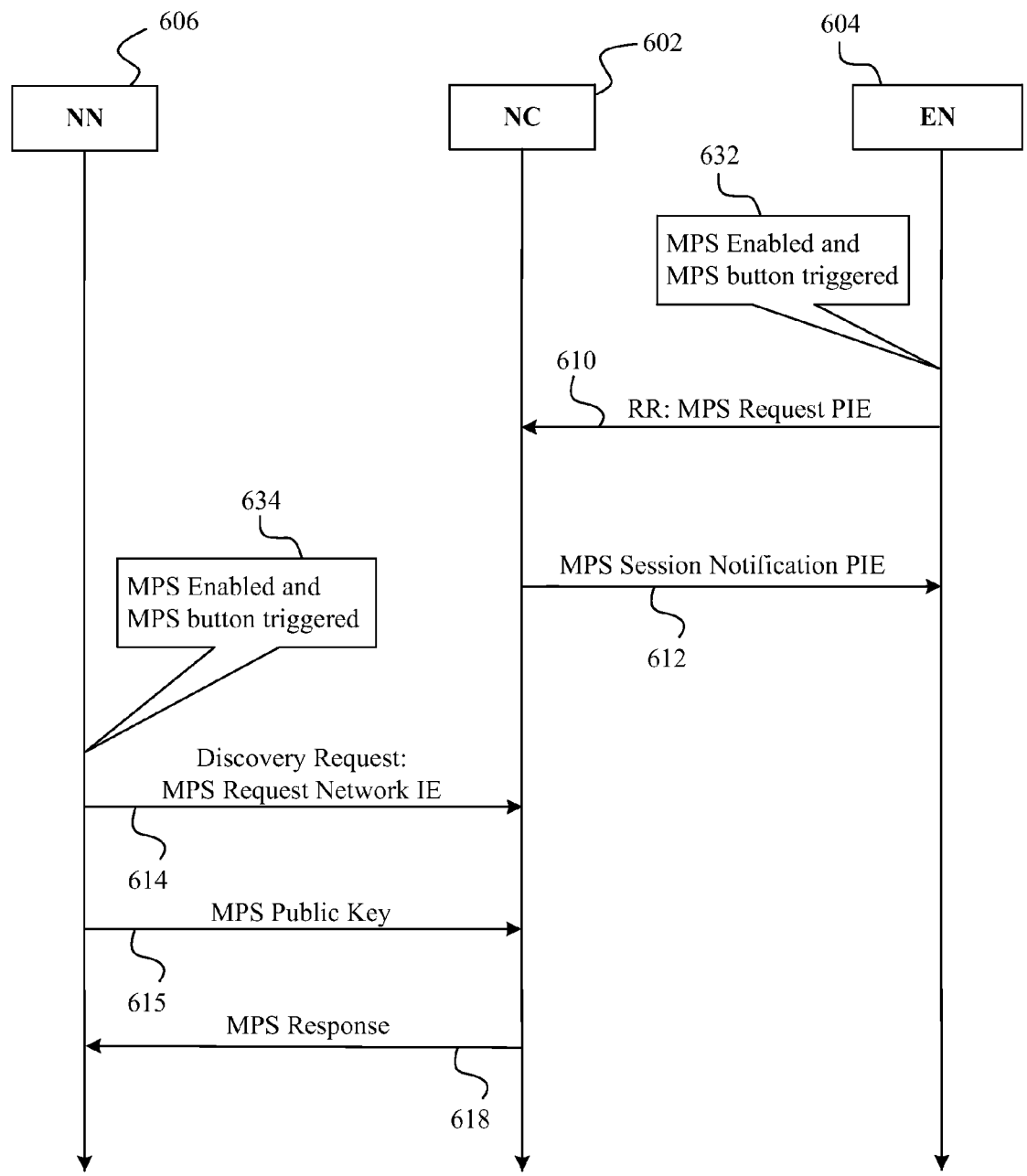
FIG. 6 shows example message exchange sequences, and functions and tasks performed by various nodes, in accordance with various aspects of the present disclosure.

FIG. 6 shows message exchange sequences, and functions and tasks performed by various nodes, in accordance with various aspects of the present disclosure. In an example implementation, if the MPS$_{EN}$ of the EN 604 is set to DISABLE, then the EN 604 may for example ignore any MPS trigger event. However, when the EN 604 has its MPS enabled and is triggered with an MPS triggering event 632, the EN 604 may for example send an MPS Request PIE 610 in an RR to the NC 602 as shown in FIG. 6. In an example implementation, if the EN is in the Standby or Sleep Mode, it may first transition to the Active mode and forward the MPS trigger to the NC by embedding an MPS Trigger PIE in an RR (e.g., after the completion of admission). When the NC 602 receives the MPS Request PIE 610, if the PBState is equal to CLEAR and the MPSReqRx is equal to NO, the NC 602 may for example set PBState to PUSHED, set the PBNode local variable to the value of the node ID for the EN 604 as indicated in the MPS Request PIE 610, start an MPS timer, and send an MPS Session Notification PIE 612 in the next MAP. TABLE 14 shows an example format of an MPS Session Notification PIE. In an alternative example implementation, the NC 602 may disable any handoff of the NC functionality during an MPS session. Accordingly, no MPS Session Notification PIE is required to be sent to the other ENs in the network.

TABLE 14

MPS Session Notification Protocol IE Format

| Field | Length | Explanation |
|---|---|---|
| FRAME_SUBTYPE | 4 bits | 0x6 - MoCA 2 Operation |
| FRAME_TYPE | 4 bits | 0x7 - Protocol IE |
| IE_LENGTH | 6 bits | = 0 or 5 |
| RESERVED | 2 bits | Type III |
| | | Protocol IE Payload |
| TYPE | 4 bits | 0x4 - MPS Session Notification |
| MPS_STATUS_UPDATE | 4 bits | 0x0 - First MPS Trigger - Network<br>0x1 - First MPS Trigger - NN<br>0x2 - Second MPS Trigger - Network<br>0x3 - Both NN and Network Triggers<br>0x4 - End MPS session<br>Other values reserved. |
| PB_NODE | 8 bits | If MPS_STATUS_UPDATE = 0x0, 0x2, or 0x3, the value of PBNode; Otherwise, Type III reserved. |
| MPS_TIMER | 32 bits | If MPS_STATUS_UPDATE = 0x0, 0x1, 0x2, or 0x3, reflect the current MPS timer value in units of milliseconds. Otherwise, Type III reserved. |
| HASHED_PUBLIC_KEY | 96 bits | If MPS_STATUS_UPDATE = 0x1 or 0x3, the value of HashedPublicKey; Otherwise, the field is not sent. |
| MPS_REQUEST_CTC | 32 bits | If MPS_STATUS_UPDATE = 0x1 or 0x3, the value of MPSReqCTC; Otherwise, the field is not sent. |

The MPS_STATUS_UPDATE field may, for example, set to 0x0 and the PB_NODE field may, for example, be set to the value of the PBNode local variable.

If the value of PBState is CLEAR, but the value of MPSReqRx is YES, then the NC 602 may set the value of PBState to PUSHED, set the value of PBNode to the node ID of the node that sent the MPS Request Protocol IE 610 and broadcast an MPS Session Notification PIE 612 having the MPS_STATUS_UPDATE field loaded with the value 0x2 and the PB_NODE field loaded with the value of the NC's PBNode local variable.

If the value of PBState is PUSHED, then the NC 602 may for example determine whether the value of PBNode is equal to the node ID sent in the MPS Request Protocol IE 610. If so, then the NC 602 may ignore the request and take no action. However, if the value of PBNode is not equal to the node ID sent in the MPS Request Protocol IE 610, the NC 602 may reset the MPS timer, set the PBState to CLEAR and the MPSReqRx to NO, and broadcast an MPS Session Notification PIE 612 with the MPS_STATUS_UPDATE field equal to 0x4.

If the MPS timer in the NC 602 reaches MPS$_{WALK\_TIME}$, the NC 602 may for example set PBState to CLEAR, set MPSReqRx to NO, reset the MPS timer, and send an MPS Session Notification PIE 612 with the MPS_STATUS_UPDATE field loaded with the value 0x4. If, however, an NN 606 is triggered by an MPS trigger event 634 (e.g., the MPS button on the NN 606 is pressed), the NN 606 may send to the NC 602 a Pre-admission Discovery Request Message with an MPS Request Network IE 614. The NC 602 may then transmit the next Beacon with an ACF slot scheduled to allow the NC 602 to transmit an MPS Response Message 618 to the NN 606.

In the MPS Response Message 618, the NC 602 may, for example, set the CODE field and the Node's MPS parameters in the MPS_PARAMETER field as follows:

If PBState is set to CLEAR, then the NC may set the CODE field to 0x0. However, if the PBState local variable is set to PUSHED, MPSReqRx is set to YES, and the 96 MSB of SHA-256(256-bit ECDH_PUBLIC_KEY∥64-bit REQUESTING_NODE_GUID∥MPSReqCTC) is not equal to the stored value HashedPublicKey, then CODE may be set to 0x0. If the PBState local variable is set to PUSHED and MPSReqRx is set to NO or the MPSReqRx is set to YES and the 96 MSB of SHA-256(256-bit ECDH_PUB-LIC_KEY∥64-bit REQUESTING_NODE_GUID∥MPSReqCTC) is equal to the stored value Hashed-PublicKey, then CODE may be set to 0x1.

In addition, bit 2 of the MPS_PARAMETER field in the MPS Response Message 618 may be set to reflect the value of ACTIVE_PRIVACY$_{EN}$, bit 1 may be set to 0b0 and bit 0 may be set to 0b0.

In addition, in response to receiving the Pre-admission Discovery Request Network IE 614 and the MPS Public Key 615 sent by the NN 606, the NC 602 may determine the values of the CODE field and the MPS_PARAMETERS field of the MPS Response Message 618 it sent to the NN 606 and the last setting of the MPSReqRx local variable and use those values to determine how to proceed.

If the value of the CODE field of the MPS Response Message 618 is equal to 0x0 and MPSReqRx is set to NO, then the NC 602 may for example start an MPS timer, set MPSReqRx to YES, set HashedPublicKey to the value of HASHED_PUBLIC_KEY in the MPS Request Network IE, calculate MPSReqCTC as follows: MPSReqCTC=(32-bit TRANSMIT_CLOCK+18-bit ACF_POINTER) mod 232, where TRANSMIT_CLOCK and ACF_POINTER are the fields of the Beacon that scheduled the Pre-admission Discovery Request, and in the next MAP include a Network MPS Session Notification Protocol IE with MPS_STATUS_UPDATE=0x1. If the CODE field of the MPS Response Message 618 is 0x0 and MPSReqRx is set to YES, then the NC 602 may continue normal operation and no action is required.

If the CODE field of the MPS Response Message 618 is 0x1, then the NC 602 may for example reset the MPS timer, set PBState to CLEAR, set MPSReqRx to NO, send a MPS Session Notification in which the MPS_STATUS_UPDATE field is set to 0x3. In addition, the NC 602 may use the Decision Matrix of TABLE 5, and identify the Decision indicated by the applying the received and transmitted MPS_PARAMETERS.

If the Decision Matrix of TABLE 5 indicates "Node Privacy Admission", then the NC 602 may for example continue normal operation.

If the Decision Matrix of TABLE 5 indicates "Failed" then the NC 602 may for example report the pairing failure to the management entity using MPS$_{PAIR\_FAIL}$ and continue normal operation.

If the Decision Matrix of TABLE 5 indicates "NC to NN PSWD Exchange", then the NC 602 may for example perform a MPS PSWD exchange in which the NC 602 will provide the password to the NN 606.

In accordance with an example implementation, the NC 602 will not transmit a MPS Session Notification PIE if there are no MOCA 2.1 nodes present in the network. However, in an alternative implementation, such message may be transmitted regardless of what nodes are present. If the NC 602 drops from the network for any reason, the NC 602 may for example set PBState to CLEAR, set MPSReqRx to NO and reset the MPS timer if it is running.

Figure 7:
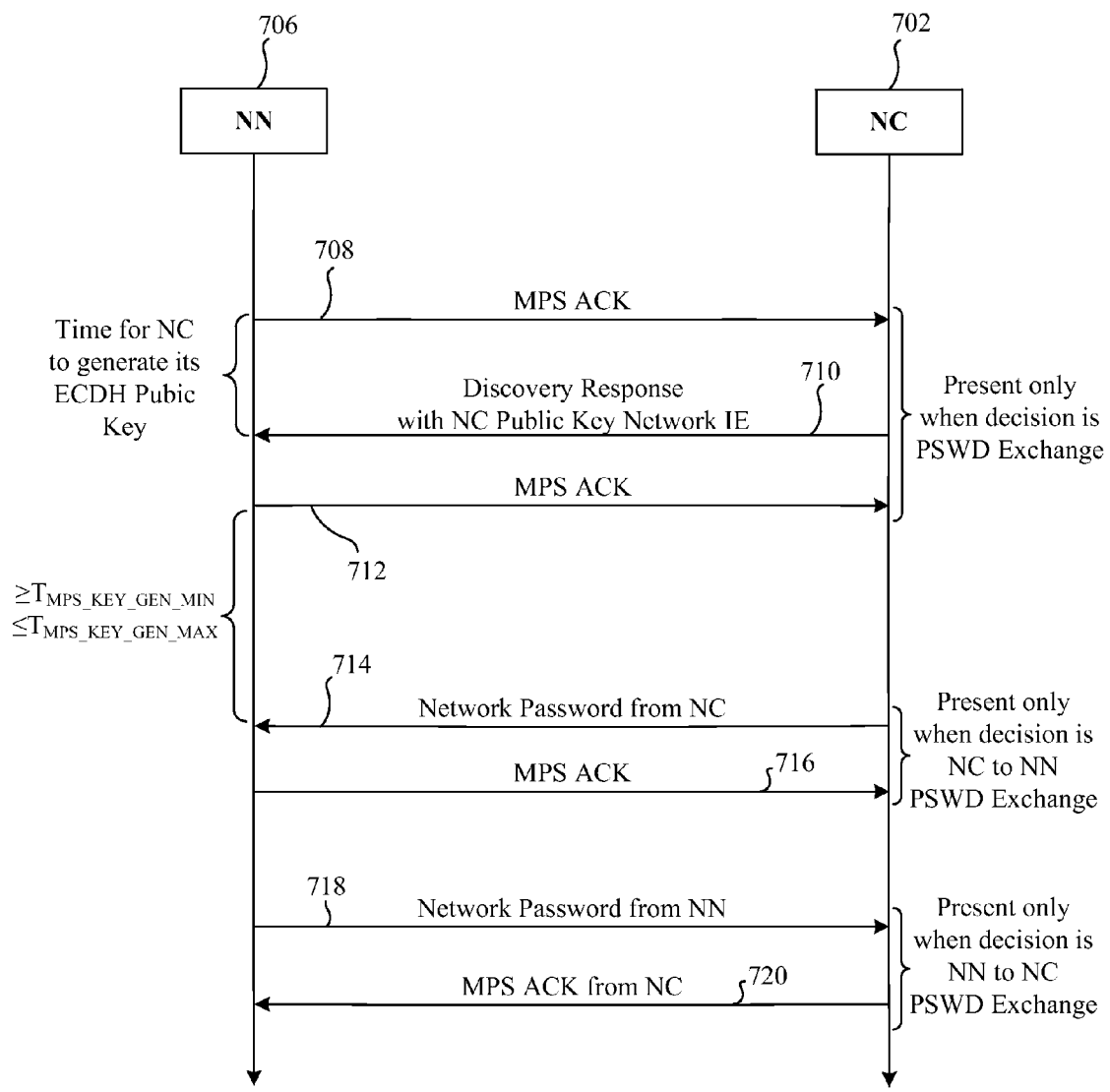
FIG. 7 shows example message exchange sequences, and functions and tasks performed by various nodes, in accordance with various aspects of the present disclosure.

FIG. 7 shows example message exchange sequences, and functions and tasks performed by various nodes, in accordance with various aspects of the present disclosure. For example, the example message exchange sequences may take place between an NN 706 and an NC 702 during a password exchange. In accordance with an example implementation, when the decision indicated by the Decision Matrix of TABLE 5 indicates that a password exchange is to be carried out, the exchange is carried out as follows. If the exchange is not completed successfully, the NN 706 will set the PBState local variable to CLEAR and the NC 702 will set the MPSReqRx variable to NO. The NC 702 will then resume normal operation and the NN 706 will resume performing a network search.

When the decision is made to perform a password exchange, the NC 702 may for example transmit the next Beacon with an ACF scheduled with ACF_TYPE set to 0x0F and ADDITIONAL_ACF_TYPE set to 0x21. The NN 706 may then transmit an MPS ACK Message 708. TABLE 15 shows an example format of an MPS ACK Message.

TABLE 15

MPS ACK Message Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0x7 - MPS Message |
| PACKET_TYPE | 4 bits | 0x9 - Link control II |
| VERSION | 8 bits | 0x10 |
| RESERVED | 8 bits | |
| SOURCE_NODE_ID | 8 bits | 0x00 |
| RESERVED | 8 bits | |
| DESTINATION_NODE_ID | 8 bits | The NC node ID |
| PACKET_LENGTH | 16 bits | The total length of the MPDU frame body in bytes (excluding the MPDU header). |
| MPDU_CONTROL_INFORMATION | 32 bits | RESERVED |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 (x^16 + x^15 + x^2 + 1). |
| Frame Payload | | |
| TYPE | 4 bits | 0x2 - MPS ACK |
| RESERVED | 28 bits | Type III |
| GUID | 64 bits | 64-bit MAC address of the device |
| Payload FCS | | |
| PAYLOAD_FCS | 32 bits | For all the Management and Control MPDUs, and for the Ethernet data packet, the 32-bit FCS is calculated using CRC-32-IEEE 802.3 (x^32 + x^26 + x^23 + x^22 + x^16 + x^12 + x^11 + x^10 + x^8 + x^7 + x^5 + x^4 + x^2 + x + 1). For the A_PDU sub-header the 16-bit FCS is calculated using the CRC-16 (x^16 + x^15 + x^2 + 1), the same as for the MPDU header FCS. |

If the NC 702 does not receive the MPS ACK Message 708 from the NN 706, the NC 702 may schedule in the next Beacon an ACF slot. The NC 702 may then retransmit the MPS Response Message that lead to the password exchange. The MPS Response Message may be sent in the ACF slot (not shown in FIG. 7). In the following Beacon, the NC may then schedule another ACF slot for the MPS ACK Message from the NN. The NC may repeat the retransmission of the MPS Response Message and rescheduling of the MPS ACK Message 708 until it either receives the MPS ACK Message 708 from the NN 706 or the NC 702 completes a predetermined number of repetitions. If after predetermined number of repetitions the NC 702 does not receive the MPS ACK Message 708, the NC 702 may abort the MPS password exchange.

Upon successful reception of MPS ACK Message 708, the NC 702 may schedule an ACF slot with ACF_TYPE=0x0F and ADDITIONAL_ACF_TYPE=0x02 and transmit an MPS Public Key Message 710 to the NN 706. An example frame format of the MPS Public Key Message is shown in TABLE 12.

After transmitting the Public Key Message 710, the NC 702 will schedule in the next Beacon an ACF slot for a MPS ACK. The NN 706 will acknowledge the reception of NC Public Key by sending an MPS ACK Message 712 in the scheduled slot. An example format of the MPS ACK Message 712 is shown in TABLE 15. If the NC 702 does not receive the MPS ACK from the NN 706, the NC 702 may schedule in the next Beacon an ACF slot and retransmit the MPS Public Key Message in the scheduled ACF slot. In the following Beacon the NC 702 may then schedule another ACF slot for the MPS ACK from the NN 706. The NC 702 may repeat the retransmission of the Public Key Message 710 and rescheduling of the MPS ACK 712 until either it receives the ACK 712 from the NN 706 or it completes a predetermined number of repetitions. If after the predetermined number of repetitions the NC 702 does not receive the MPS ACK 712, the NC 702 will consider the exchange to have been unsuccessful and abort the MPS password exchange. If the password exchange is an NC to NN PSWD Exchange, then upon receiving the MPS ACK Message 712 from the NN 706, the NC 702 may transmit an MPS Network Password Message 714 to the NN 706 at least a first predetermined number of seconds and not more than a second predetermined number of seconds after the receipt of the MPS ACK 712. In an example implementation, the first predetermined number of seconds is determined by a local variable, $T_{MPS\_KEY\_GEN\_MIN}$ and the second predetermined time is determined by a local variable, $T_{MPS\_KEY\_GEN\_MAX}$. The MPS Network Password Message 714 may, for example, be transmitted in an ACF slot. TABLE 16 shows an example format of an MPS Network Password Message.

TABLE 16

MPS Network Password Message Format

| Field | Length | Usage |
|---|---|---|
| MPDU Header | | |
| TRANSMIT_CLOCK | 32 bits | This value is the scheduled time derived from the corresponding AU in the MAP. |
| PACKET_SUBTYPE | 4 bits | 0x7 - MPS Message |
| PACKET_TYPE | 4 bits | 0x9 - Link control II |
| VERSION | 8 bits | 0x10 |
| RESERVED | 8 bits | |
| SOURCE_NODE_ID | 8 bits | The NC node ID when sent by the NC. 0x00 otherwise. |
| RESERVED | 8 bits | |
| DESTINATION_NODE_ID | 8 bits | 0x00 when sent by the NC. The NN node ID otherwise. |
| PACKET_LENGTH | 16 bits | The total length of the MPDU frame body in bytes (excluding the MPDU header). |

TABLE 16-continued

MPS Network Password Message Format

| Field | Length | Usage |
|---|---|---|
| MPDU_CONTROL_INFORMATION | 32 bits | RESERVED |
| HEADER_FCS | 16 bits | MPDU header Frame Check Sequence - is calculated over the MPDU header starting from the Transmit_Clock field and ending with (including) the MPDU_CONTROL_Information field. The HEADER_FCS is calculated using CRC-16 ($x^{16} + x^{15} + x^2 + 1$). |
| Frame Payload | | |
| TYPE | 4 bits | 0x3 - MPS Network Password |
| RESERVED | 28 bits | Type III |
| NETWORK_PASSWORD | 512 bits | The network password. If the password length is less than 64 bytes, pad the password to 64 bytes with leading ASCII zeros. |
| Payload FCS | | |
| PAYLOAD_FCS | 32 bits | For all the Management and Control MPDUs, and for the Ethernet data packet, the 32-bit FCS is calculated using CRC-32-IEEE 802.3 ($x^{32} + x^{26} + x^{23} + x^{22} + x^{16} + x^{12} + x^{11} + x^{10} + x^8 + x^7 + x^5 + x^4 + x^2 + x + 1$). For the A_PDU sub-header the 16-bit FCS is calculated using the CRC-16 ($x^{16} + x^{15} + x^2 + 1$), the same as for the MPDU header FCS. |

In accordance with an example implementation, the Message 714 may be encrypted using AES with an MPSKey. Alternatively, just the field carrying the password might be encrypted.

After transmitting the Network Password Message 714, the NC 702 may schedule in the next Beacon an ACF slot with ACF_TYPE=0x0F and ADDITIONAL_ACF_TYPE=0x21. The NN 706 may then acknowledge the reception of Network Password Message 714 by sending an MPS ACK Message 716.

The NN 702 may then use the new password it received from the NC 702 for network admission. The NN 706 may also report a parameter ACTIVE_PSWD with a value equal to the new password to its management entity, and a parameter $ACTIVE\_PRIVACY_{EN}$ having a value equal to "Enabled" if $PRIVACY_{EN}$ is configured as DISABLED by the management entity.

If the NC 702 does not receive the MPS ACK 716 from the NN 706, the NC 702 may schedule in the next Beacon an ACF slot with ACF_TYPE=0x0F and ADDITIONAL_ACF_TYPE=0x22 and retransmit the Network Password Message 714. In the following Beacon, the NC 702 may schedule another ACF slot for the MPS ACK 716 from the NN 706. The NC 702 may, for example, repeat the retransmission of the Network Password Message 714 and rescheduling of the MPS ACK until it either receives the ACK 716 from the NN 706 or it completes a predetermined number of repetitions. If after the predetermined number of repetition the NC 702 does not receive the ACK 716, the NC 702 may abort the MPS password exchange.

If the password exchange is an NN to NC PSWD Exchange, then upon receiving the Public Key ACK Message 712, the NC 702 may schedule an ACF slot with ACF_TYPE=0x0F and ADDITIONAL_ACF_TYPE=0x23, for example between TMPS_KEY_GEN_MIN and TMPS_

KEY_GEN_MAX after it receives the ACK Message 712. The NN 702 may transmit a Network Password Message 718 in the scheduled ACF slot. In accordance with an example implementation, the Message 718 may be encrypted using AES with the MPSKey.

If the NC 702 does not receive the Network Password Message 718 from the NN 702, the NC 702 may schedule another ACF slot for the Network Password Message 718 from the NN 706 in the next Beacon. If after rescheduling the Network Password Message 718 for a predetermined number of times the NC 702 does not receive the Network Password Message 718 from the NN 706, the NC 702 may abort the MPS password exchange.

Once the NC 702 receives the Network Password Message 718 from the NN 706, the NC 702 may start using the new Privacy setting based on ACTIVE_PRIVACY$_{EN}$ and ACTIVE_PSWD for network admission. The NC 702 may also report the ACTIVE_PSWD having a value equal to the new password to the management entity and ACTIVE_PRIVACY$_{EN}$ having a value equal to "Enabled" if PRIVACY$_{EN}$ is configured as DISABLED by the management entity.

In accordance with an example implementation in accordance with various aspects of the present disclosure, MPS keys are calculated as follows: An example implementation may, for example, utilize ECDH P-256 Elliptic Curve Diffie Hellman as the cryptographic key exchange protocol. The following parameters and notations may, for example, be used for the Elliptic Curve Diffie-Hellman Exchange:

$d_{NN}$: a private key randomly selected by the NN, which is a positive integer $d_{NC}$: a private key randomly selected by the NC, which is positive integer $Q_{NN}=(X_{Q_{NN}}, y_{Q_{NN}})$: the public key computed by the NN, which is a point on the elliptic curve $Q_{NC}=(x_{Q_{NC}}, y_{Q_{NC}})$: the public key computed by the NC, which is a point on the elliptic curve p: the prime modulus d: the coefficient of the elliptic curve DHKey: a 256-bit Diffie-Hellman Shared Secret Key MPSKey: a 128-bit AES key derived from DHKey $G=(x_G, y_G)$: the base point on the elliptic curve

||: the concatenation operation sqrt(•): the square root function

The NN and the NC randomly generate their own private keys $d_{NN}$ and $d_{NC}$, respectively. The Public Keys are computed as:

$$Q_{NN}=d_{NN}G \text{ and } Q_{NC}=d_{NC}G$$

The NN and the NC send the x value of their Public Key to each other. Upon reception of the x value of the Public Key of the NC, the NN then calculates the Diffie-Hellman Shared Secret Key as:

$$DHKey=x \text{ value of } d_{NN}(x_{Q_{NN}}, \text{sqrt}((x_{Q_{NN}}^3-3x_{Q_{NN}}+b) \mod p))$$

Upon reception of the x value of the Public Key of the NC, the NC then calculates the Diffie-Hellman Shared Secret Key as:

$$DHKey=x \text{ value of } d_{NC}(x_{Q_{NC}}, \text{sqrt}(x_{Q_{NC}}, \text{sqrt}((x_{Q_{NC}}^3-3x_{Q_{NC}}+b) \mod p))$$

Both the NN and the NC calculate the MPS Key as:

$$MPSKey=\text{the first 128 bits of HMAC-SHA-256(DH-Key},x_{Q_{NN}}||NNMAC||x_{Q_{NC}}),$$

where NNMAC is the 6-byte MAC address of the NN.

In summary, various aspects of this disclosure provide systems and methods for securing a network, for admitting new nodes into an existing network, and/or securely forming a new network. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A network comprising:
    a first node; and
    a second node, wherein:
        the first node comprises at least one circuit operable to, at least:
            send a first message to the second node comprising information that indicates protected setup has been triggered;
            receive a second message from the second node indicating when the first node may send a third message comprising a public key;
            send the third message to the second node comprising the public key;
            receive a fourth message from the second node indicating when the second node will send a fifth message to the first node; and
            receive the fifth message from the second node comprising protected setup information; and
        the second node comprises at least one circuit operable to, at least:
            receive the first message;
            send the second message comprising a beacon;
            receive the third message;
            send the fourth message comprising a beacon; and
            send the fifth message.

2. The network of claim 1, wherein the fifth message comprises a first field, and the at least one circuit of the second node is operable to set the first field to a first value if protected setup is triggered and to a second value if protected setup is not triggered.

3. The network of claim 1, wherein the first message comprises hashed public key information.

4. The network of claim 1, wherein the second node is a network coordinator node.

5. A network node comprising:
    at least one circuit comprising a processor, memory, and a network communication circuit, wherein the at least one circuit is operable to, at least:
        send a first message to the second node comprising information that indicates protected setup has been triggered;
        receive a second message from the second node indicating when the first node may send a third message comprising a public key;
        send the third message to the second node comprising the public key; and
        after sending the third message, receive a fourth message from the second node comprising protected setup information.

6. The network node of claim 5, wherein the at least one circuit is operable to, prior to receiving the fourth message, receive a fifth message from the second node indicating when the second node will send the fourth message.

7. The network node of claim 5, wherein the first message comprises hashed public key information.

8. The network node of claim 5, wherein the at least one circuit is operable to send the first message in response to being triggered by a user to join a network.

9. The network node of claim 5, wherein the fourth message comprises a protected setup response message.

10. The network node of claim 5, wherein the at least one circuit is operable to analyze a first field of the fourth message to determine whether admission of the network node to a network of the second node was successful.

11. The network node of claim 5, wherein the at least one circuit is operable to:
analyze a first field of the fourth message; and
if the first field is a particular value, then analyze a second field of the fourth message to determine how to proceed.

12. The network node of claim 11, wherein if the determination of how to proceed comprises determining to perform admission using privacy settings, then the at least one circuit operates to continue node admission using one or more privacy settings of the network node.

13. The network node of claim 11, wherein if the determination of how to proceed comprises determining that a failure has occurred, then the at least one circuit operates to continue searching for a network.

14. The network node of claim 11, wherein if the determination of how to proceed comprises determining to perform admission without privacy, then the at least one circuit operates to change a privacy setting of a local parameter to indicate no privacy, and to report a change in the privacy setting to a management entity of the network node.

15. The network node of claim 11, wherein if the determination of how to proceed comprises determining to perform a network coordinator (NC) to new node (NN) password exchange, then the at least one circuit operates to perform a password exchange by which the network node receives a password from the second node.

16. The network node of claim 11, wherein if the determination of how to proceed comprises determining to perform a new node (NN) to network coordinator (NC) password exchange, then the at least one circuit operates to perform a password exchange by which the network node transmits a password to the second node.

17. A network node comprising:
at least one circuit comprising a processor, memory, and a network communication circuit, wherein the at least one circuit is operable to, at least:
receive a first message from a second node comprising information that indicates protected setup has been triggered;
in response to at least the received first message, transmit a second message indicating when the second node may transmit a third message comprising a public key;
receive the third message from the second node; and
in response to at least the received third message, transmit a fourth message to the second node comprising protected setup information.

18. The network node of claim 17, wherein the at least one circuit is operable to transmit a fifth message in response to at least the received third message indicating when the second node may transmit the fourth message.

19. The network node of claim 17, wherein the fourth message comprises a first field, and the at least one circuit of the network node operates to set the first field to a first value if protected setup is triggered and to a second value if protected setup is not triggered.

20. The network node of claim 17, wherein the fourth message comprises a first field, and the at least one circuit of the network node operates to determine a value of the first field based, at least in part, on a hashed public key value received from the second node in the first message and on a public key received from the second node in the third message.

21. The network node of claim 20, wherein the at least one circuit of the network node operates to determine the value of the first field based also, at least in part, on an address of the second node.

22. The network node of claim 17, wherein the network node is a beaconing node.

23. The network node of claim 17, wherein the network node is a network coordinator node.

* * * * *

UNITED STATES PATENT AND TRADEMARK OFFICE
CERTIFICATE OF CORRECTION

PATENT NO. : 9,819,698 B2  
APPLICATION NO. : 14/921667  
DATED : November 14, 2017  
INVENTOR(S) : Yoav Hebron et al.

Page 1 of 1

It is certified that error appears in the above-identified patent and that said Letters Patent is hereby corrected as shown below:

In the Claims

Claim 5, Column 34, delete Lines 49-63, and replace it with:
-- 5. A network node comprising:
    at least one circuit comprising a processor, memory, and a network communication circuit, wherein the at least one circuit is operable to, at least:
    send a first message to a second node comprising information that indicates protected setup has been triggered;
    receive a second message from the second node indicating when the first node may send a third message comprising a public key;
    send the third message to the second node comprising the public key; and
    after sending the third message, receive a fourth message from the second node comprising protected setup information. --

Signed and Sealed this
Eighteenth Day of February, 2020

Andrei Iancu
*Director of the United States Patent and Trademark Office*